(12) United States Patent
Faneco

(10) Patent No.: US 11,208,175 B2
(45) Date of Patent: Dec. 28, 2021

(54) CONTINUOUSLY VARIABLE TRANSMISSION FOR A BICYCLE

(71) Applicant: Simon James Faneco, Lausanne (CH)

(72) Inventor: Simon James Faneco, Lausanne (CH)

(*) Notice: Subject to any disclaimer, the term of this patent is extended or adjusted under 35 U.S.C. 154(b) by 255 days.

(21) Appl. No.: 16/062,679

(22) PCT Filed: Dec. 16, 2016

(86) PCT No.: PCT/EP2016/081433
§ 371 (c)(1),
(2) Date: Jun. 15, 2018

(87) PCT Pub. No.: WO2017/103110
PCT Pub. Date: Jun. 22, 2017

(65) Prior Publication Data
US 2018/0370595 A1     Dec. 27, 2018

(30) Foreign Application Priority Data
Dec. 16, 2015   (EP) .................................... 15200583

(51) Int. Cl.
*B62M 9/08*     (2006.01)
*F16H 61/662*   (2006.01)
(Continued)

(52) U.S. Cl.
CPC ................ *B62M 9/08* (2013.01); *B62K 3/04* (2013.01); *F16H 9/18* (2013.01); *F16H 37/021* (2013.01); *F16H 61/66245* (2013.01)

(58) Field of Classification Search
CPC .. F16H 55/56; F16H 55/563; F16H 61/66245; F16H 63/067; B62M 9/06
(Continued)

(56) References Cited

U.S. PATENT DOCUMENTS 3,362,242 A * 1/1968 Watkins ................ F16H 63/067
                                                    474/15
3,599,504 A * 8/1971 Taylor ............... F16H 61/66227
                                                    474/12
(Continued)

FOREIGN PATENT DOCUMENTS

DE    4314580 A1    11/1994
FR    1162845 A      9/1958
(Continued)

OTHER PUBLICATIONS

Office Action in corresponding EPO 15200583.1 dated Mar. 24, 2021 (pp. 1-12).
(Continued)

*Primary Examiner* — Henry Y Liu
(74) *Attorney, Agent, or Firm* — Millen, White, Zelano & Branigan, P.C.; William Nixon

(57) ABSTRACT

The present invention relates to a continuously variable transmission (1000, 8000) for a bicycle comprising: input means (1100, 2100, 3100), output means (1300, 2300, 3300, 4300, 300, 6300), and transmission means (1200) connecting the input means to the output means, wherein the output means comprise output controlling means (1340, 2340, 3340, 4340, 5340, 6340) controlling a gear ratio of the output means, wherein the continuously variable transmission is a V-belt type continuously variable trans mission.

13 Claims, 15 Drawing Sheets

(51) Int. Cl.
  *F16H 9/18* (2006.01)
  *F16H 37/02* (2006.01)
  *B62K 3/04* (2006.01)
(58) Field of Classification Search
  USPC .................................................. 474/13–15
  See application file for complete search history.

(56) References Cited

U.S. PATENT DOCUMENTS

| | | | | |
|---|---|---|---|---|
| 3,709,052 A * | 1/1973 | Lassanske | ............ | F16H 55/563 474/13 |
| 3,757,593 A * | 9/1973 | Svenson | ........... | F16H 61/66227 474/12 |
| 3,786,688 A * | 1/1974 | Svenson | ........... | F16H 61/66245 474/19 |
| 3,926,020 A * | 12/1975 | Dantowitz | ........ | F16H 61/66245 474/11 |
| 3,939,720 A * | 2/1976 | Aaen | ..................... | F16H 55/563 474/14 |
| 3,948,112 A * | 4/1976 | Gilbert | ..................... | B62M 9/06 474/14 |
| 3,958,461 A * | 5/1976 | Aaen | ..................... | F16H 55/563 474/14 |
| 4,036,068 A * | 7/1977 | Gilbert | ..................... | B62M 9/06 474/14 |
| 4,099,737 A * | 7/1978 | Waugh | ..................... | B62M 9/06 280/261 |
| 4,119,326 A * | 10/1978 | Porter | ..................... | B62M 9/06 280/236 |
| 4,364,735 A * | 12/1982 | Plamper | ................ | F16H 55/563 474/13 |
| 4,384,862 A * | 5/1983 | Nakane | ............ | F16H 61/66245 192/105 B |
| 4,515,575 A * | 5/1985 | Kinbara | ............ | F16H 61/66227 474/11 |
| 4,585,430 A * | 4/1986 | Gaddi | ............... | F16H 61/66263 474/12 |
| 4,743,041 A * | 5/1988 | Vazin | ....................... | B62M 9/08 280/236 |
| 4,781,663 A * | 11/1988 | Reswick | ................... | F16H 9/10 474/49 |
| 4,790,799 A * | 12/1988 | Sadler | ..................... | F16G 3/02 474/201 |
| 4,913,684 A * | 4/1990 | Mantovaara | ............. | B62M 9/06 474/12 |
| 5,121,936 A * | 6/1992 | Cowan | ................ | B62M 11/145 280/236 |
| 5,127,882 A * | 7/1992 | Mantovaara | ............ | F16H 9/125 474/8 |
| 5,167,591 A * | 12/1992 | Cowan | ................ | B62M 11/145 475/211 |
| 5,215,323 A * | 6/1993 | Cowan | ................ | B62M 11/145 280/236 |
| 5,222,572 A * | 6/1993 | Yamagiwa | ............... | B62M 7/04 180/220 |
| 5,405,158 A * | 4/1995 | Wilding | .................. | F16H 55/56 280/261 |
| 5,605,514 A * | 2/1997 | Driver | ..................... | B62M 9/08 280/236 |
| 6,149,540 A * | 11/2000 | Johnson | .................... | F16H 9/18 474/14 |
| 6,520,878 B1 * | 2/2003 | Leclair | .................. | F16H 55/563 474/12 |
| 6,656,068 B2 * | 12/2003 | Aitcin | ..................... | F16H 9/125 474/12 |
| 6,733,406 B2 * | 5/2004 | Kitai | ........................ | F16H 55/56 474/13 |
| 6,743,129 B1 * | 6/2004 | Younggren | ............. | F16H 55/56 474/17 |
| 7,803,074 B2 * | 9/2010 | Ishida | ................... | F16H 63/067 474/8 |
| 7,892,121 B2 * | 2/2011 | Oishi | .................... | F16H 55/563 474/17 |
| 8,496,551 B2 * | 7/2013 | Mueller | ................ | F16H 63/067 474/17 |
| 8,894,520 B2 * | 11/2014 | Labbe | ................... | F16H 63/067 474/19 |
| 9,796,449 B2 * | 10/2017 | Dommsch | ................ | B62M 6/55 |
| 2012/0238384 A1 * | 9/2012 | Lee | ..................... | F16H 37/0846 474/25 |
| 2014/0248981 A1 * | 9/2014 | Lee | .......................... | F16H 9/10 474/8 |
| 2015/0024882 A1 * | 1/2015 | Ochab | .................. | F16H 63/067 474/19 |
| 2015/0276027 A1 | 10/2015 | Pattakos et al. | | |
| 2015/0323065 A1 | 11/2015 | Pattakos et al. | | |
| 2016/0052595 A1 | 2/2016 | Dommsch | | |
| 2016/0325802 A1 * | 11/2016 | Leiber | ..................... | C22B 25/06 |
| 2018/0037212 A1 * | 2/2018 | Beyer | ...................... | F16H 9/18 |
| 2018/0355966 A1 * | 12/2018 | Mariotti | ................ | F16H 55/563 |

FOREIGN PATENT DOCUMENTS

| | | |
|---|---|---|
| JP | 9144824 A | 6/1997 |
| JP | 3002884 B2 | 1/2000 |
| JP | 2000145539 A | 5/2000 |
| JP | 2003291882 A | 10/2003 |
| JP | 2007177689 A | 7/2007 |
| TW | M465340 U | 11/2013 |
| WO | 14170061 A1 | 10/2014 |

OTHER PUBLICATIONS

English translation of Office Action in corresponding TW application 105141784 dated Feb. 9, 2021 (pp. 1-8).
English Abstract of JP 3002884, publication dated Jan. 24, 2000.
English Abstract of JP 2000145539, publication dated May 23, 2000.
English Abstract of JP 2003291882, publication dated Oct. 15, 2003.
English Abstract of JP 2007177689, publication dated Jul. 12, 2007.
English translation of Search Report for related Japanese Patent Application No. 2018-530757 dated Oct. 19, 2020.
English translation of Office Action in corresponding JP2018-530757 dated Oct. 25, 2021 (pp. 1-7).

* cited by examiner

CONTINUOUSLY VARIABLE TRANSMISSION FOR A BICYCLE

CROSS-REFERENCE TO RELATED APPLICATIONS

This application is an U.S. national phase application under 35 U.S.C. § 371 based upon co-pending International Application No. PCT/EP2016/081433 filed on Dec. 16, 2016. Additionally, this U.S. national phase application claims the benefit of priority of co-pending International Application No. PCT/EP2016/081433 filed on Dec. 16, 2016 and European Application No. 15200583.1 filed on Dec. 16, 2015. The entire disclosures of the prior applications are incorporated herein by reference. The international application was published on Jun. 22, 2017 under Publication No. WO 2017/103110 A1.

FIELD OF THE INVENTION

The present invention relates to the field of bicycle transmissions. More specifically, the invention relates to a continuously variable transmission for a bicycle.

BACKGROUND DESCRIPTION

Several bicycle transmissions are known. For instance, the majority of bicycles today have a gearing system that consists of a chain that wraps around a front and rear sprocket to transmit power. To achieve different gear ratios, either the front or rear sprocket have a number of different sizes and a derailleur mechanism pushes the chain from one sprocket position to another.

Such a system suffers from a plurality of problems. The chain and the sprocket are exposed to the weather in order to reduce weight, thus requiring periodical maintenance in terms of cleaning and lubrication. Moreover, the coordination of the front and rear sprockets requires knowledge of the gearing system from the user. In general, the front and rear sprockets should be used so as to keep the chain in a substantially aligned positioned between the front and rear sprockets. Moreover, the system does not allow a user to change gear when not moving, which usually results in a problem when a user peddling with a higher gear suddenly stops and has to start again using the higher gear. Additionally, the chain often falls off the sprockets. Moreover, the chain needs to have slack in it, so as to adapt to different sized sprockets, which requires a tensioner to be provided, increasing cost and complexity. This tensioner is normally combined with the rear derailleur mechanism, which means the rear derailleur and the tensioner cause a substantial amount of weight to be positioned on the rear axle. This is inconvenient since it moves the centre of mass of the bicycle toward the rear extremity thereof, resulting in a less convenient handling. Particularly in the case of bicycles with a rear suspension, the additional weight on the rear axle causes an increase in unsprung weight, also reducing the stability of the bicycle, especially when the suspension is working over rough terrain.

Alternative transmissions are known in the prior art, for example, hub gear systems, which comprise of a plurality of planetary gears. Those transmissions solve some of the problems of the chain and sprocket type of transmission. For instance, they can be sealed so as to reduce required maintenance. However, they are usually heavier than the chain and sprocket type transmission and most of the weight is positioned on the rear axle, thus increasing the handling issues described above.

Moreover, both the hub gear transmission and the chain and sprocket type transmission have a discrete number of gear ratios. During their use, what generally happens is that the inexperienced user will refrain from regular gear changes, for instance when facing a short slope, as the user does not generally wish to constantly operate the gear selection mechanism. This is however inconvenient, as it forces the user to pedal at non-optimum frequency.

This latter problem is solved by the Nu Vinci transmission, which is a type of constantly variable transmission. The Nu Vinci design is contained in the rear hub, so it has the same benefits and drawbacks as the hub gear mechanism, apart from allowing a larger gear ratio range, up to 9× on the latest models.

However, also the Nu Vinci system suffers from several problems. The Nu Vinci mechanism functions by having a series centrally mounted spherical metal balls that have contact faces from the input and output drives. As the input and output contact faces change their radii of contact, the gear ratio is changed. This mechanism is very sensitive to tolerance, because if one ball is too large, or an input or output contact face does not contact, there will be a increase risk of slippage. Therefore seriously tight controls will be required to manufacture this mechanism repeatedly, which means a high cost of manufacture. Additionally the Nu Vinci is rather heavy by construction. Compared with other products on the market it is among the heaviest gear change system available.

OBJECT OF THE INVENTION

It is therefore an object of the present invention to provide an improved bicycle transmission.

In particular, it is the object of some embodiments of the present invention to provide a constantly variable transmission that allows the user to ideally select the best gear ratio among an infinite number of ratios. Moreover, it is the object of some embodiment of the invention, to provide an automatic selection of the gear ratio so that the user is not requested to operate the transmission. Additionally, it is the object of some embodiments of the invention to place the weight of the transmission toward the center of the bicycle and/or so as not to contribute to unsprung weight in bicycles with rear suspension.

SUMMARY OF THE INVENTION

The above-mentioned object is achieved by the teaching of the independent claims.

In particular, an embodiment of the invention may relate to a continuously variable transmission for a bicycle comprising: input means, output means, and transmission means connecting the input means to the output means, wherein the output means comprise output controlling means controlling a gear ratio of the output means, wherein the continuously variable transmission is a V-belt type continuously variable transmission.

Thanks to this approach it is possible to obtain a continuously variable transmission for a bicycle, thus overcoming the disadvantages associated with transmissions having a discrete number of gears.

In some embodiments, the output controlling means can increase the gear ratio of the output means when the speed of the output means increases.

Thanks to this approach it is possible to automatically control the gear of the transmission, thus advantageously avoiding linearly increasing the pedaling rate with the speed of the bicycle. In some embodiments, this also makes it possible to maintain a substantially constant pedaling rate, irrespective of the speed of the bicycle.

In some embodiments, the output controlling means can comprise output elastic means and output actuating means, wherein the output elastic means can bias the output means toward a lower gear, and wherein the output actuating means can actuate the output means toward a higher gear.

Thanks to this approach it is possible to implement the transmission in a simple and reliable manner.

In some embodiments, the output controlling means can comprise a preloading means preloading the output elastic means.

Thanks to this approach it is possible for a user to configure the transmission to adapt to his or her riding style.

In some embodiments, the output actuating means can comprise weights actuating the output means by means of centrifugal force.

Thanks to this approach the transmission can be implemented in a simple and reliable manner.

In some embodiments, the output actuating means and/or input controlling means controlling a gear ratio of the input means are remotely controllable and comprise a hydraulic pump or a pneumatic pump or an electric motor or a cable.

Thanks to this approach, it is possible to remotely control the ratio of the transmission.

In some embodiments, the input means can comprise input controlling means controlling a gear ratio of the input means, the input controlling means can comprise input elastic means, and the spring constant of the output elastic means can be higher than the spring constant of the input elastic means, preferably at least 5% higher, or more.

Thanks to this approach it is possible to ensure a bias of the transmission toward a lower gear in the absence of other forces operating on the transmission. In this manner it is possible to ensure that a lower gear is engaged, for instance, when the bicycle comes to a stop.

In some embodiments, the output controlling means can comprise a locking means for locking the position of the output controlling means.

Thanks to this approach it is possible to lock the transmission to a given ratio for the duration intended by the user.

In some embodiments, the output controlling means can comprise an electric motor or a transducer, or an electrical position control device.

Thanks to this approach it is possible to have more flexibility in controlling the gear ratio. In particular, the gear ratio can be controlled independently of the speed of the bicycle or of the rotational speed of the transmission.

In some embodiments, the continuously variable transmission can further comprise controlling means sensing a speed, preferably a speed of the output means or a speed of a wheel of the bicycle, and controlling the output controlling means, in particular so as to maintain a predetermined pedal ratio irrespective of the bicycle speed.

Thanks to this approach it is possible to configure several different behaviors of the transmission in an electronic manner.

In some embodiments, the continuously variable transmission cab further comprise an input shaft and an output shaft, input multiplying means multiplying a rotational speed of the input means with respect to the input shaft, and output multiplying means multiplying a rotational speed of the output means with respect to the output shaft.

Thanks to this approach it is possible to reduce the dimensions of the transmission, as the forces exerted on the input and output are reduced by the multiplying effect.

In some embodiments, the input shaft and the output shaft can be co-axial.

Thanks to this approach it is possible to reduce the dimensions of the transmission.

An embodiment of the invention can further relate to a bicycle comprising: a crankshaft, a rear axle, and a continuously variable transmission according to any embodiment, wherein the input means are connected, eventually with a first transmission, to the crankshaft, and wherein the output means are connected, eventually with a second transmission, to the rear axle.

Thanks to this approach it is possible to obtain a bicycle which has an ideal weight distribution, in addition to the advantages obtained by the transmission.

An embodiment of the invention can further relate to a bicycle comprising: a crankshaft, a rear axle, and a continuously variable transmission according to any embodiment, wherein the input shaft is connected, eventually with a first transmission, to the crankshaft, and wherein the output shaft is connected, eventually with a second transmission, to the rear axle.

Thanks to this approach it is possible to obtain a bicycle which has an ideal weight distribution, in addition to the advantages obtained by the transmission.

In some embodiments, the first transmission can have a first transmission ratio causing the input means or the input shaft to rotate faster than the crankshaft, and/or the second transmission can have a second transmission ratio causing the output means or the output shaft to rotate faster than the rear axle.

Thanks to this approach it is possible to implement at least part of the multiplying effect by means of one or more transmissions.

DETAILED DESCRIPTION OF THE INVENTION

Figure 1A:
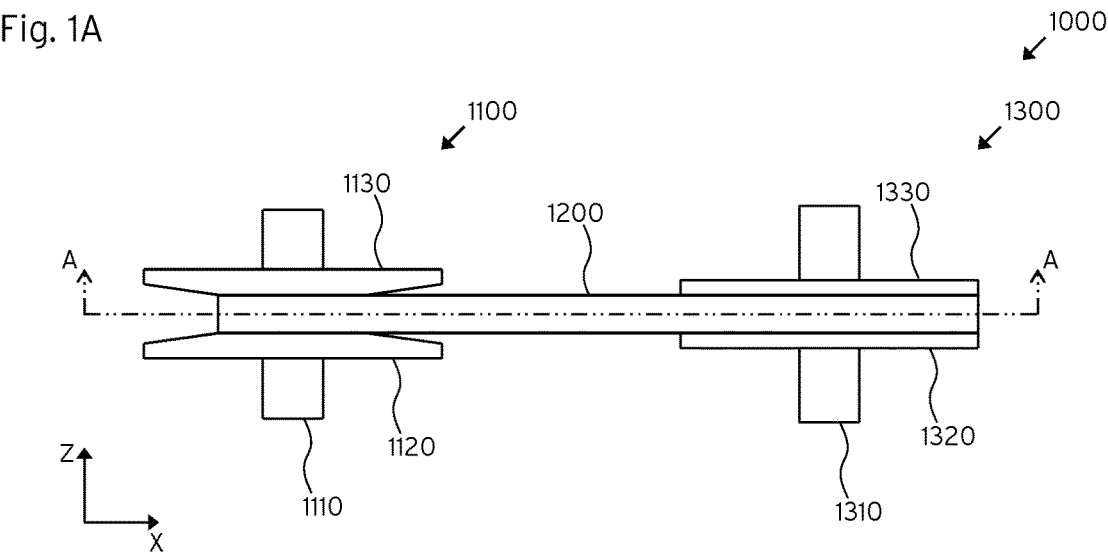
FIG. 1A schematically illustrates a top view of elements of a continuously variable transmission in accordance with an embodiment of the present invention.

In the following, preferred embodiments of the present invention will be described in detail with reference to the drawings. The following embodiments are provided only for illustrative purposes so that those skilled in the art can fully understand the present invention. Therefore, the present invention is not to be limited by the following embodiments but may be implemented in other forms, as defined by the claims.

In the drawings and in the description, equal reference numerals refer to equal elements. It will be understood that, in the drawings, the width, length and thicknesses of some elements may by exaggerated for convenience of illustration and ease of understanding.

Figure 1B:
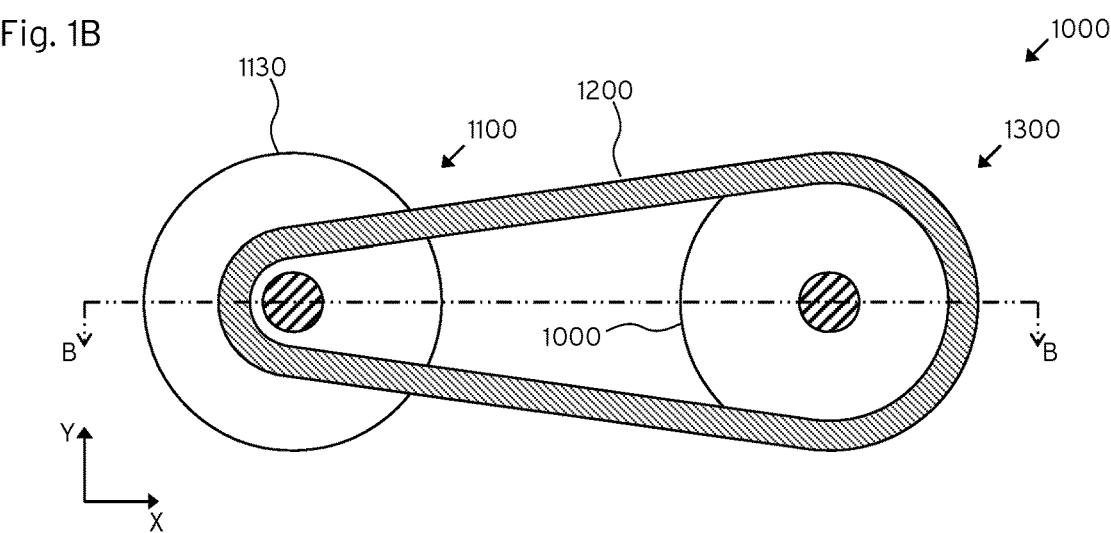
FIG. 1B schematically illustrates a section view of the embodiment of FIG. 1A along plane A-A.
Figure 1C:
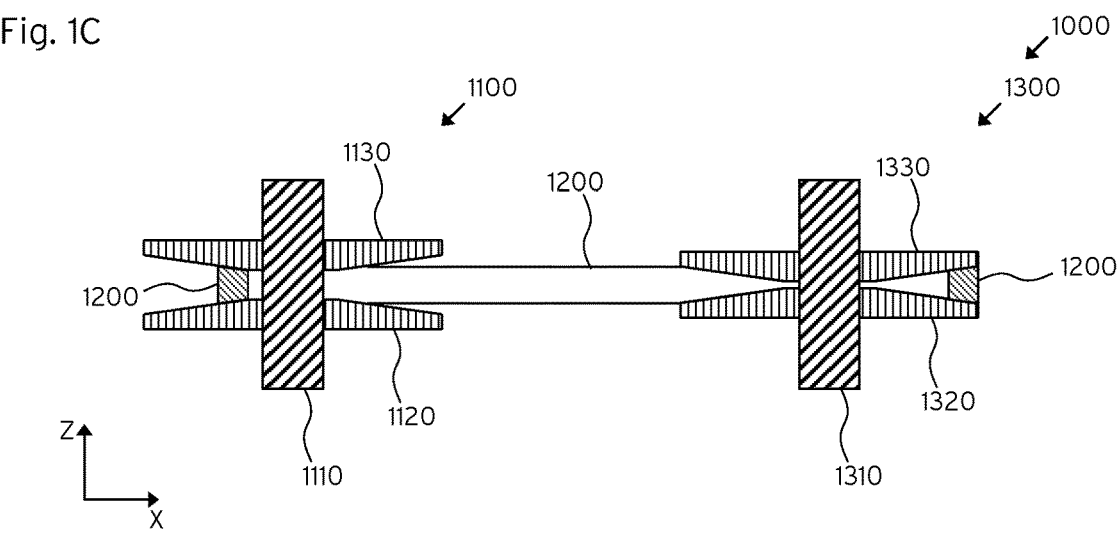
FIG. 1C schematically illustrates a section view of the embodiment of FIG. 1A along a second plane B-B, perpendicular to the plane of FIG. 1B.

FIG. 1A schematically illustrates a top view of elements of a continuously variable transmission in accordance with an embodiment of the present invention. FIG. 1B schematically illustrates a section view of the embodiment of FIG. 1A along a first plane XY identified by the arrows A. FIG. 1C schematically illustrates a section view of the embodiment of FIG. 1A along a plane XZ, perpendicular to the plane of FIG. 1B, and identified by the arrows B.

The continuously variable transmission 1000 can be used for transmitting power from the crankshaft to a rear axle of a bicycle and comprises input means 1100, output means 1300, and transmission means 1200 connecting the input means 1100 to the output means 1300.

The continuously variable transmission 1000 can be of a V-belt type. Accordingly, the input means 1100 comprise a first input flange 1120, a second input flange 1130 and an input shaft 1110. At least one of the first input flange 1120 and second input flange 1130 is movable on the input shaft 1110 along a direction Z, so as to vary the distance between the first input flange 1120 and second input flange 1130. In a similar manner, the output means 1300 comprise a first output flange 1220, a second output flange 1330 and an output shaft 1310. At least one of the first output flange 1320 and second output flange 1330 is movable on the output shaft 1310 along a direction Z, so as to vary the distance between the first output flange 1320 and second output flange 1330.

The first and second input flanges 1120, 1130, and the first and second output flanges 1320, 1330, are substantially shaped as a disks having a taper radially inwards toward their centers. In this manner, the first and second input flanges 1120, 1130, and the first and second output flanges 1320, 1330 respectively form an input V section and an output V section. By using a transmission means 1200 having a V shape, for instance a V-shaped belt, fitting the input V section and the output V section, it is possible to transmit power from the input means 1100 to the output means 1300.

Moreover, since the first and second input flanges 1120, 1130, and the first and second output flanges 1320, 1330, are movable, the position of the input V section with respect to the input shaft 1110 and the position of the output V section with respect to the output shaft 1310 can be changed, resulting in a gear ratio change of the transmission.

In particular, in the position illustrated in FIG. 1B, the transmission means 1200 is in a closer position with respect to the input shaft 1110 and in a further position with respect to the output shaft 1310. In this position, the gear of the continuously variable transmission 1000 is at a lower value. In other words, more than one rotation of the input means 1100 will be required to achieve one rotation of the output means 1300. Conversely, when the first and second input flanges 1120, 1130, are placed closer to each other, and the first and second output flanges 1320, 1330 are placed further away from each other, the continuously variable transmission 1000 exhibits a higher gear. That is, less than one rotation of the input means 1100 will be required to achieve one rotation of the output means 1300.

Thanks to this behavior, it is possible to obtain a wide range of gear ratios in a continuous manner, thus improving the limited and discrete number of gear ratios of the chain and sprocket type.

In order to change the gear ratio the continuously variable transmission 1000 comprises at least output controlling means 1340, which will be described with reference to FIGS. 2A and 2B.

Figure 2A:
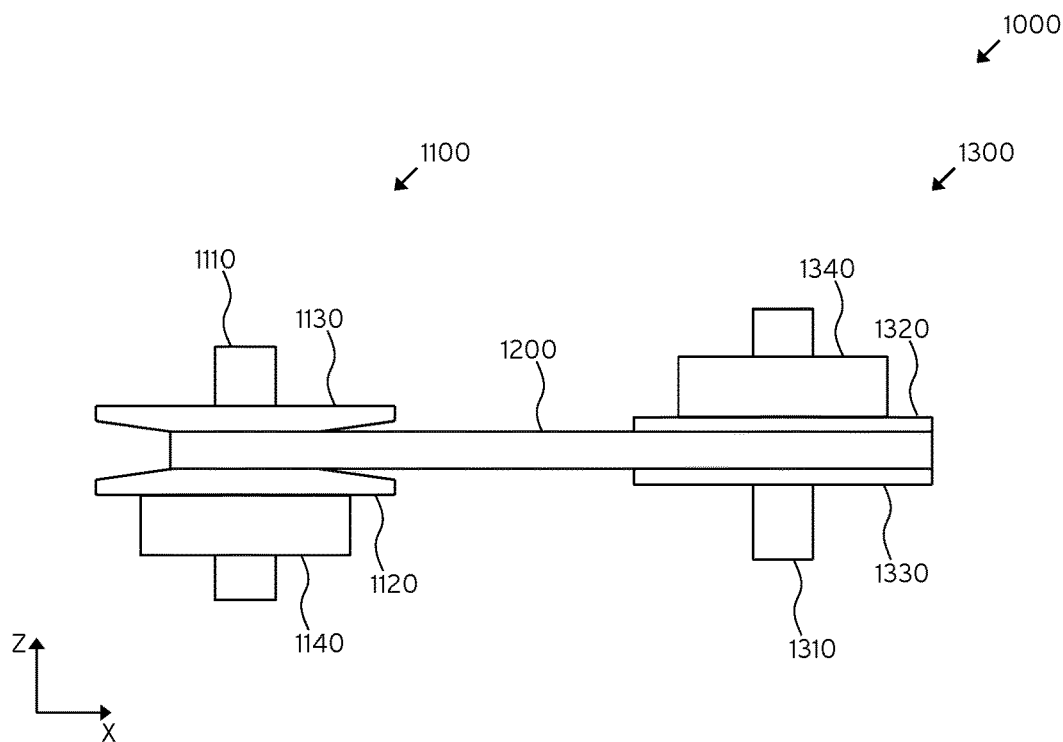
FIG. 2A schematically illustrates elements of a continuously variable transmission in accordance with an embodiment of the present invention, in a lower gear.
Figure 2B:
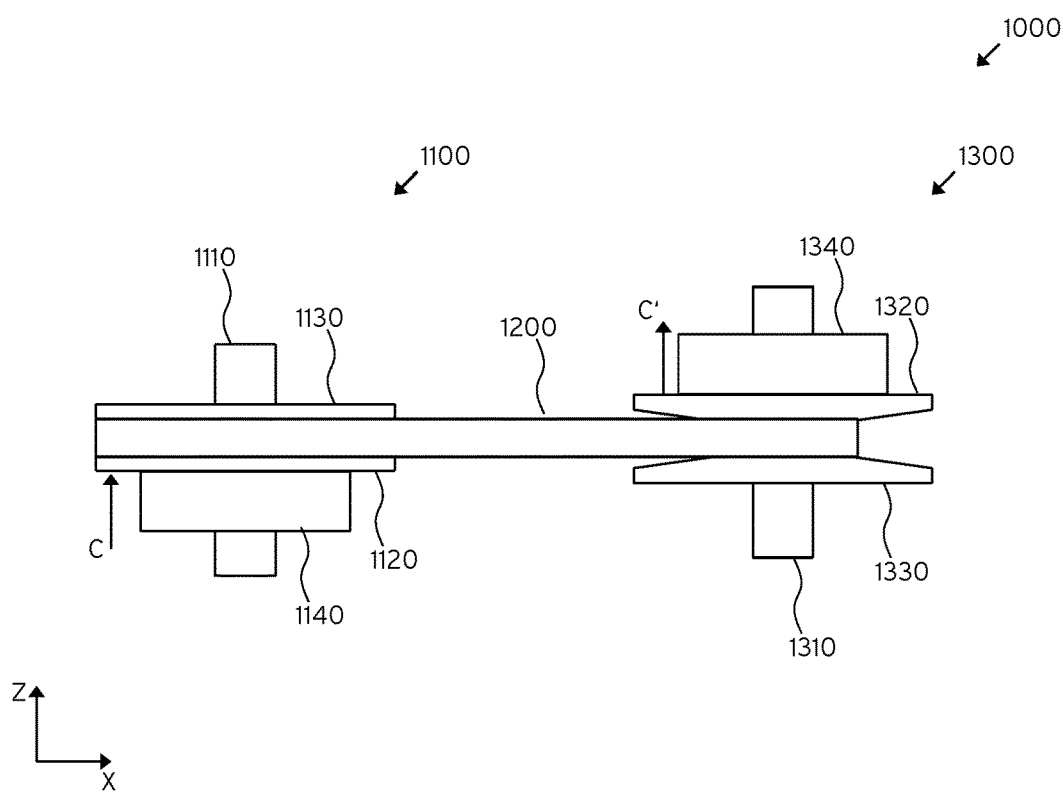
FIG. 2B schematically illustrates elements of a continuously variable transmission in accordance with an embodiment of the present invention, in a higher gear.

FIG. 2A schematically illustrates elements of a continuously variable transmission 1000 in accordance with an embodiment of the present invention, in a lower gear. FIG. 2B schematically illustrates elements of a continuously variable transmission 1000 in accordance with an embodiment of the present invention, in a higher gear.

In particular, the input means 1100 further comprise input controlling means 1140, while the output means 1300 further comprise output controlling means 1340. The input controlling means 1140 can be implemented by any means capable of influencing the distance between the first and second input flanges 1120 and 1130. Similarly, the output controlling means 1340 can be implemented by any means capable of influencing the distance between the first and second output flanges 1320 and 1330. In the following description, several examples will be provided in which the input controlling means 1140 and/or the output controlling means 1340 are realized with a mechanical, pneumatic, hydraulic, or electric elements.

Although the input controlling means 1140 and the output controlling means 1340 have been illustrated to the two opposite sides of the input means 1100 and of the output means 1300, the present invention is not limited thereto, and the input controlling means 1140 and the output controlling means 1340 could be realized on the same side of the input means 1100 and of the output means 1300. The placement of the input controlling means 1140 and of the output controlling means 1340 on two opposite sides of the input and output means 1100, 1300, is advantageous as it allows the transmission means 1200 to run in a substantially straight line between the input means 1110 and the output means 1310. In particular, the input controlling means 1140 can be operated so as to move the input flange 1120, as schematically illustrated by arrow C, while the input flange 1130 is fixed. Similarly, the output controlling means 1340 can be operated so as to move the output flange 1320, as schematically illustrated by arrow C', while the output flange 1330 is fixed.

Figure 3A:
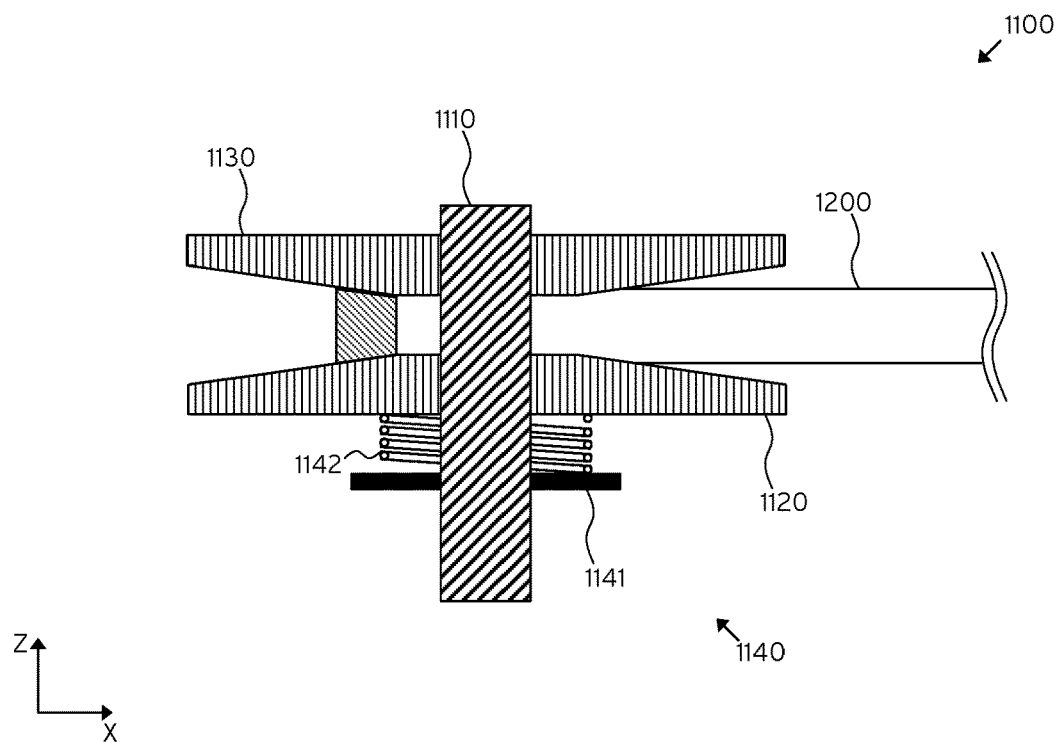
FIG. 3A schematically illustrates a section view of input elements of a continuously variable transmission in accordance with an embodiment of the present invention, in a lower gear.
Figure 3B:
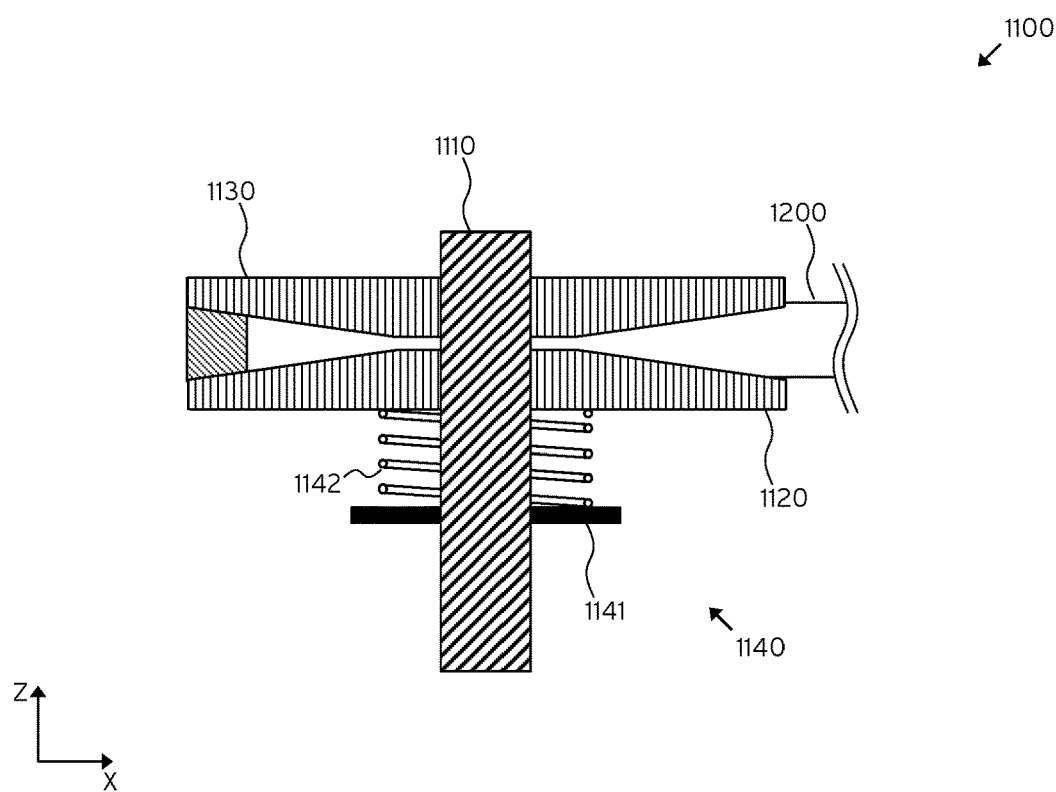
FIG. 3B schematically illustrates a section view of input elements of a continuously variable transmission in accordance with an embodiment of the present invention, in a higher gear.

FIG. 3A schematically illustrates a section view of input elements of a continuously variable transmission 1000, in accordance with an embodiment of the present invention, in a lower gear. FIG. 3B schematically illustrates the same input elements in a higher gear.

In particular, input controlling means 1140, part of the input means 1100, comprise an input elastic means 1142 and an input plate 1141. In some embodiments, the input elastic means 1142 could be a coil spring, as illustrated. However, the present invention is not limited thereto and any means providing an elastic characteristic can be used instead such as, for instance, an air spring.

Moreover, although the input plate 1141 has been illustrated in order to clarify how the input controlling means 1140 can operated by limiting the movement of the input elastic means 1142 along the negative Z direction, the present invention is not limited thereto and any means capable of limiting the movement of the input elastic means 1142 can be used instead. For instance, a pin extending from the input shaft 1110 could be used. Such a pin may also be used to provide a slight rotation to flange 1120 as it slides to assist the transmission means 1200 change ratio smoothly.

The input plate 1141 is fixed with respect to the input shaft 1110. Such fixing could be achieved by screwing of the input plate 1141 onto input shaft 1110, by a pressure fitting of the two elements, by gluing, welding, or fixing the two elements by means of a non-illustrated nut. In general, any manner of fixing the position of the input plate 1141, at least in the Z direction, with respect to the input shaft 1110 can be implemented.

Since the position of the input plate 1141 is fixed in the Z direction, the input elastic means 1142 will bias the first input flange 1120 toward the positive Z direction. That is, toward a higher gear of the continuously variable transmission 1000. In the absence of any other force biasing the transmission means 1200 toward the deposition illustrated in FIG. 3A, the transmission means 1200 will therefore be biased toward the position illustrated in FIG. 3B, corresponding to a higher gear, by the movement of the input flange 1120 toward the input flange 1130 caused by the input controlling means 1140.

Figure 4A:
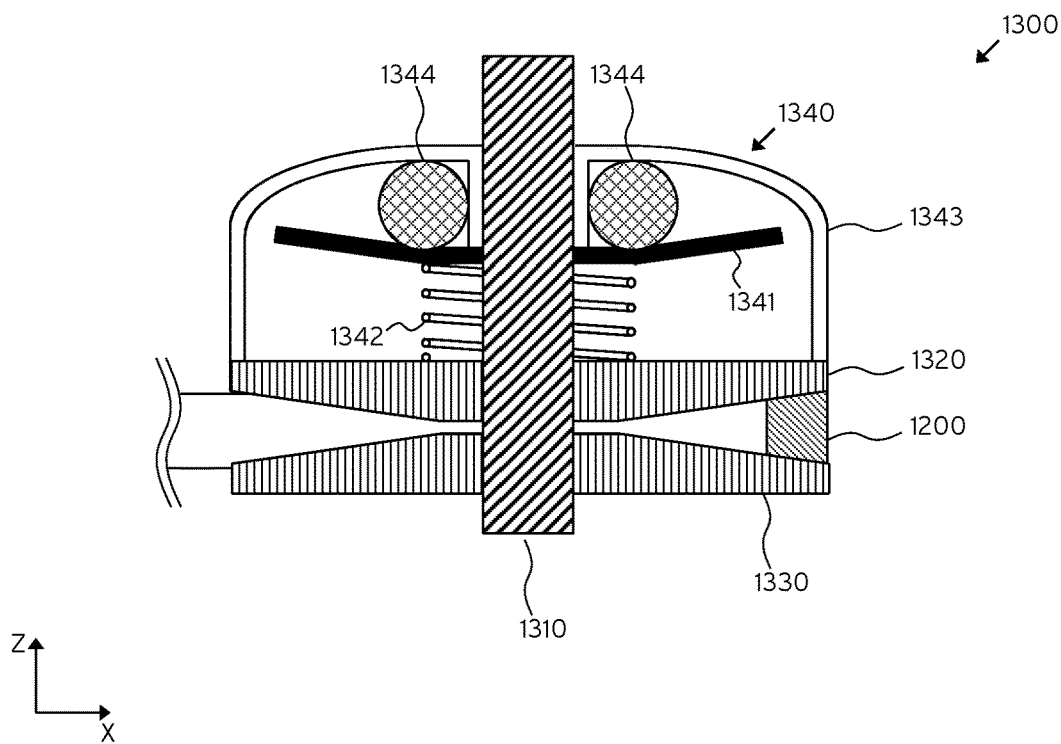
FIG. 4A schematically illustrates a section view of output elements of a continuously variable transmission in accordance with an embodiment of the present invention, in a lower gear.
Figure 4B:
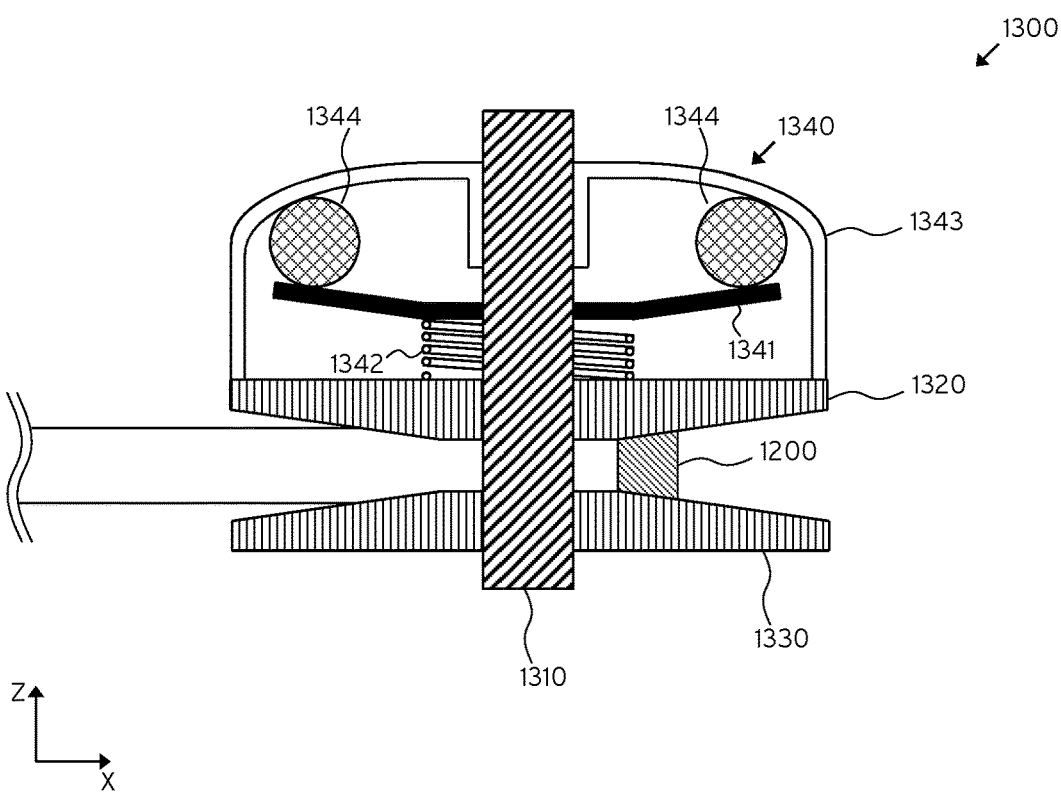
FIG. 4B schematically illustrates a section view of output elements of a continuously variable transmission in accordance with an embodiment of the present invention, in a higher gear.

A similar implementation can be used for the output controlling means 1300 as well, as schematically illustrated in FIGS. 4A and 4B. In particular, FIG. 4A schematically illustrates a section view of output elements of a continuously variable transmission 1000, in accordance with an embodiment of the present invention, in a lower gear. FIG. 4B schematically illustrates the same output elements in a higher gear Output means 1300 comprise output controlling means 1340 comprising output elastic means 1342 and output actuating means 1344. Here, the output elastic means 1342 bias the output means 1300 toward a lower gear, and the output actuating means 1344 actuate the output means 1300 toward a higher gear.

In particular, the output elastic means 1342 operates in a manner substantially similar to the input elastic means 1142 in conjunction with the output plate 1341. Thus, the same considerations made for the input elastic means 1142 and the input plate 1141 apply to the output elastic means 1342 and output plate 1341 as well.

The presence of the input elastic means 1142 and of the output elastic means 1342 guaranteed that the transmission means 1200 always presents a certain degree of tension to ensure sufficient friction with the input means 1100 and the output means 1300. However, the input elastic means 1142 and the output elastic means 1342 cannot, on their own, change the gear ratio of the continuously variable transmission 1100. Such change is achieved by the output actuating means 1344.

In the output controlling means 1340, the output actuating means 1344 are weights, possibly shaped as balls or rollers or any other shape allowing the weights to move along output plate 1341. When the output means 1300 rotates, the output actuating means 1344 are moved by centrifugal force away from the output shaft 1310, resulting in the positioning illustrated in FIG. 4B. As the output plate 1341 is fixed with respect to the output shaft 1310, the movement of the output actuating means 1344 causes the movement of case 1343, capable of moving along the output shaft 1310, in the positive Z direction. The case 1343 is connected to the outputs flange 1320, which moves as well.

The movement of the case 1343 and of the output flange 1320 along the positive Z direction is contrasted by the output elastic means 1342, biasing the output flange 1320 toward the negative Z direction. In this manner, when the output means 1300 are not rotating, the output means will be positioned as illustrated in FIG. 4A. As the output means 1300 start rotating, the output actuating means 1344 will move outwardly due to centrifugal force causing the output means 1300 to move toward the position illustrated in FIG. 4B. In other words, the output controlling means 1340 increases the gear ratio of the output means 1300 when the speed of the output means 1300 increases.

This makes the continuously variable transmission 1000 particularly advantageous when used in combination with a bicycle in which the output means 1300 are connected, eventually with a transmission as will be described below, to the rear axle of the bicycle. In particular, when the bicycle is not moving, the output controlling means 1340 will position the output means 1300 in a lower gear as illustrated in FIG. 4A, thus making it easier for the user to start the bicycle. As the bicycle starts moving and the rear axle starts turning, the output actuating means 1344 move outwardly due to centrifugal force thus allowing the output controlling means 1340 to position the output means 1300 in a higher gear, such as illustrated in FIG. 4B. This behavior allows to the user to have a substantially stable pedaling frequency at different speeds, without requiring any input from the user.

In some embodiments, the input flanges 1120, 1130 are preloaded, by means of input elastic means 1142, at a load smaller than the one applied by output elastic means 1342 to the output flanges 1320, 1330. Thanks to this the rear sliding flange 1320 is biased inwards and the front sliding flange 1120 is biased outwards, in the absence of any effect of output actuating means 1344.

In some embodiments, the preload on the input flanges 1120, 1130 can be as small as sufficient to ensure that, as the output flange 1320 moves outwards, tension is maintained on the transmission means 1200.

In some embodiments, the spring constant of the output elastic means 1342 can be higher than the spring constant of the input elastic means 1142, preferably at least 5% higher or more. Thanks to this difference, it can be ensured that once the output controlling means 1340 does not apply any force on the output means 1300, the output means 1300 will be biased toward a lower gear, as illustrated for instance in FIG. 4A. In other words, if the force exerted by the output elastic means 1342 is higher than the one exerted by the input elastic means 1142, it is possible to ensure that—in the absence of a force applied by the output actuating means 1344—the continuously variable transmission is biased toward a lower gear.

At the same time, embodiments of the invention allow the user to control the pedaling frequency to a higher or lower value, instead of, or in addition to, the control operated by the output controlling means 1340. This can be achieved, for instance, by controlling the preload of the input means 1100 and/or of the output means 1300 as will be described below. Alternatively, or in addition, this can be achieved by providing a manually or electronically activated actuating means, as will be described further below. Still alternatively, or in addition, adjusting the mass of output actuating means 1344 also will adjust the pedal frequency.

Figure 5A:
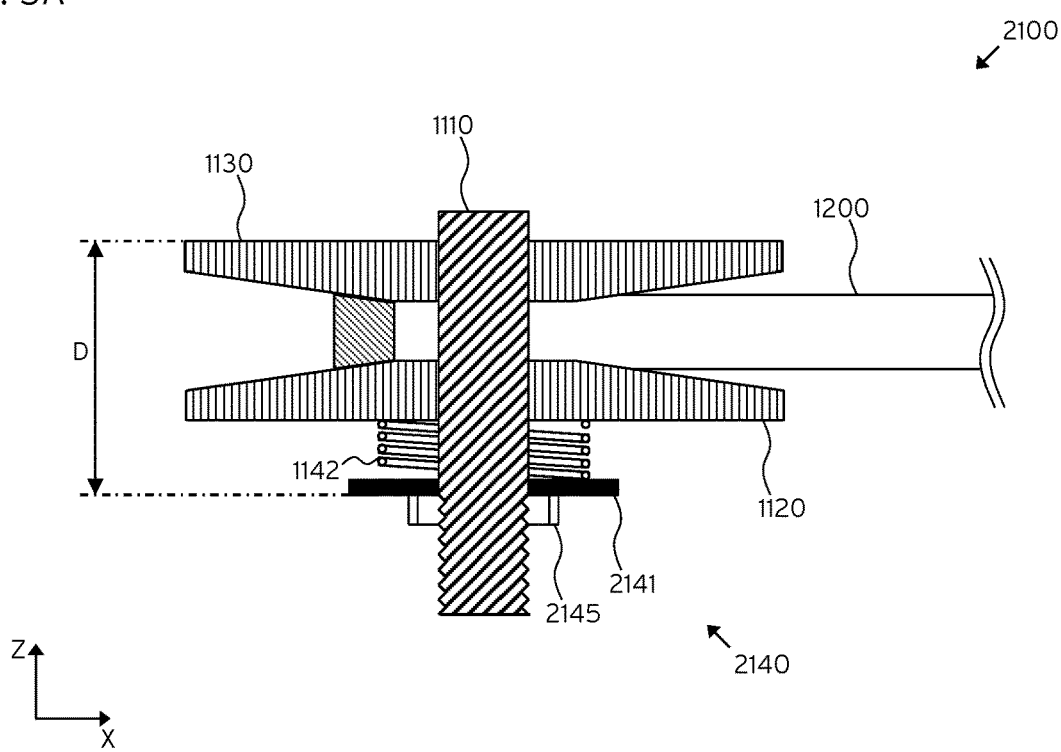
FIG. 5A schematically illustrates a section view of pre-loadable input elements of a continuously variable transmission in accordance with an embodiment of the present invention, in a lower gear and higher preload.
Figure 5B:
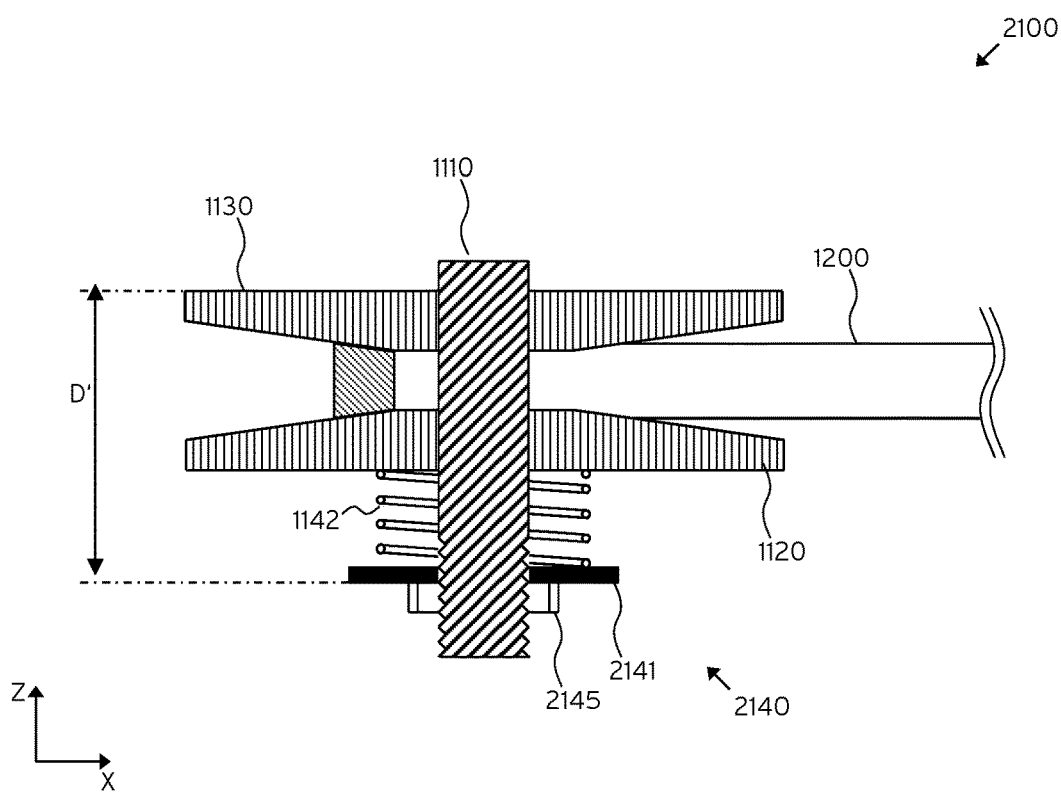
FIG. 5B schematically illustrates a section view of pre-loadable input elements of a continuously variable transmission in accordance with an embodiment of the present invention, in a lower gear and lower preload.

FIGS. 5A and 5B schematically illustrate a section view of preloadable input elements of a continuously variable transmission 1000, in accordance with an embodiment of the present invention. In particular FIG. 5A schematically illustrates a lower gear and higher preload while FIG. 5B schematically illustrates a lower gear and lower preload.

The preloadable input means 2100 differ from input means 1100 in that the preloadable input controlling means 2140 replace the input controlling means 1140. In particular, the preloadable input controlling means 2140 allow the positioning of the preloadable input plate 2141 along the input shaft 1110 to be controlled by means of a preloading means 2145. In the embodiment illustrated in FIGS. 5A and 5B, the preloading means 2145 is illustrated as a nut screwed on a threaded portion of input shaft 1110. By screwing or unscrewing the nut, the distance between the preloadable input plate 2141 and the second input flange 1130 can be varied, as schematically illustrated by arrows D and D'. This provides the user with the possibility of changing the elastic biasing force exerted by the input elastic means 1142. This results in a change of the characteristic of the continuously variable transmission. In particular, when a higher preload is applied such as illustrated in FIG. 5A, the continuously variable transmission will allow the user to have a higher gear at any given speed of the bicycle, thus resulting in a lower pedaling frequency.

It will be understood that although the positioning and locking mechanism of the preloadable input plate 2141 has been described with reference to a nut as preloading means 2145, the present invention is not limited thereto. Alternatively, or in addition, any system allowing the input elastic means 1142 to be more or less compressed can be implemented by the present invention.

Alternatively, or in addition, in order for the input elastic means 1142 to exert a different force on the first input flange 1120, the user can manually replace the input elastic means 1142 with a different input elastic means 1142 having a stronger or weaker elastic constant.

Alternatively, or in addition, the preloading described above with reference to the preloadable input means 2100 can be implemented at the output means 1300, as will be described with reference to FIGS. 6A and 6B.

Figure 6A:
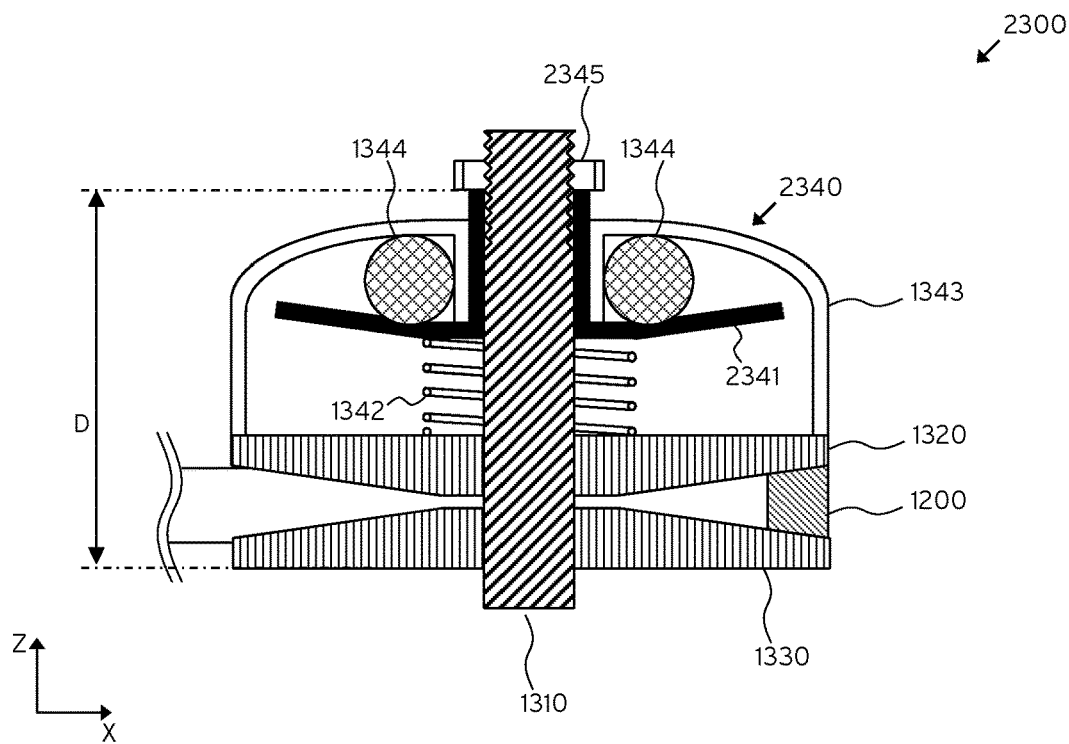
FIG. 6A schematically illustrates a section view of pre-loadable output elements of a continuously variable transmission in accordance with an embodiment of the present invention, in a lower gear and lower preload.
Figure 6B:
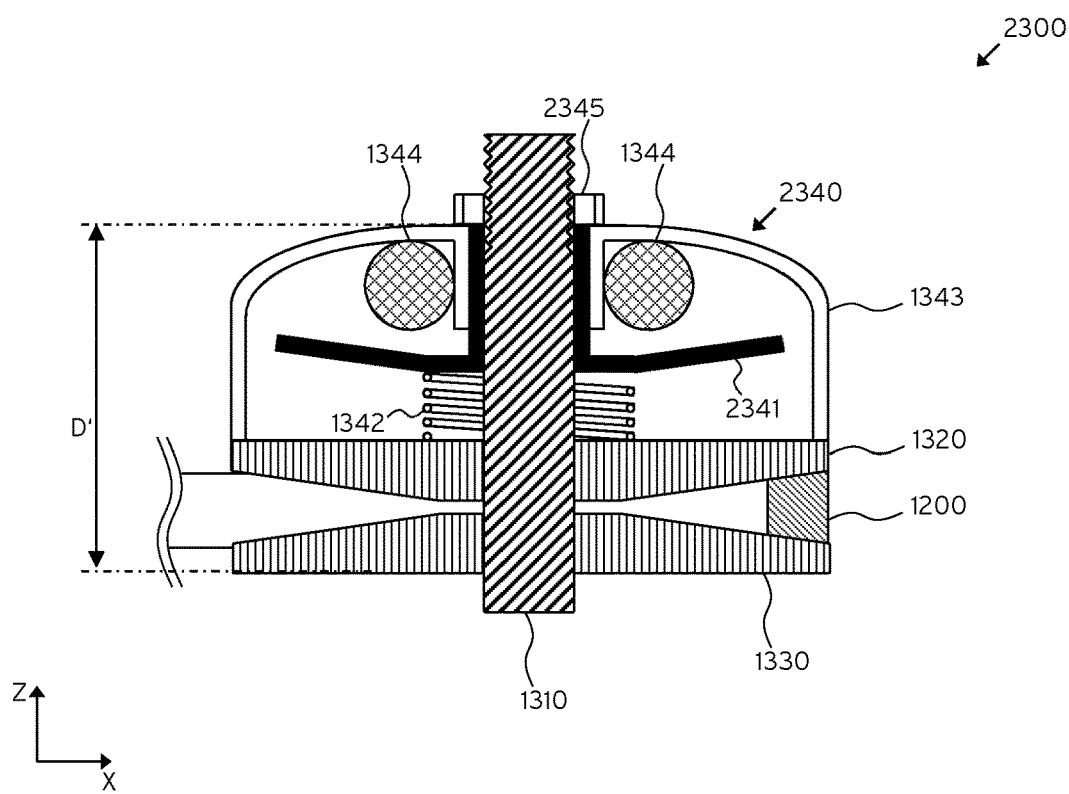
FIG. 6B schematically illustrates a section view of pre-loadable output elements of a continuously variable transmission in accordance with an embodiment of the present invention, in a lower gear and higher preload.

In particular, FIGS. 6A and 6B schematically illustrate a section view of preloadable output elements of a continuously variable transmission 1000, in accordance with an embodiment of the present invention. In particular FIG. 6A schematically illustrates a lower gear and lower preload while FIG. 6B schematically illustrates a lower gear and higher preload.

The operation of the preloadable output means 2300 is substantially similar to that of the preloadable input means 2100. In particular, the preloadable output means 2300 comprise a preloadable input plate 2341, the positioning of which can be controlled by a preloading means 2345. By varying the preload, that is, by varying the distance D, D', between the preloading means 2345 and the fixed output flange 1330, the preload of the preloadable output means 2300 can be controlled by the user. Also in this case, replacing the output elastic means 1342 can also vary the preload.

The preloadable input means 2100 and the preloadable output means 2300 described above both require the input or output means not to be moving, in order to change the preload. That is, they are inconvenient to the used during movement of the bicycle. The user wanting to change his pedaling frequency, or his pedaling force, during a bicycle tour is required to stop the bicycle to change the preload. This can be inconvenient in some cases, such as in a race.

In order to solve this problem, the present invention also comprises embodiments in which such preloading can be modified remotely, as will be described with reference to FIGS. 7A, 7B, 8A and 8B.

Figure 7A:
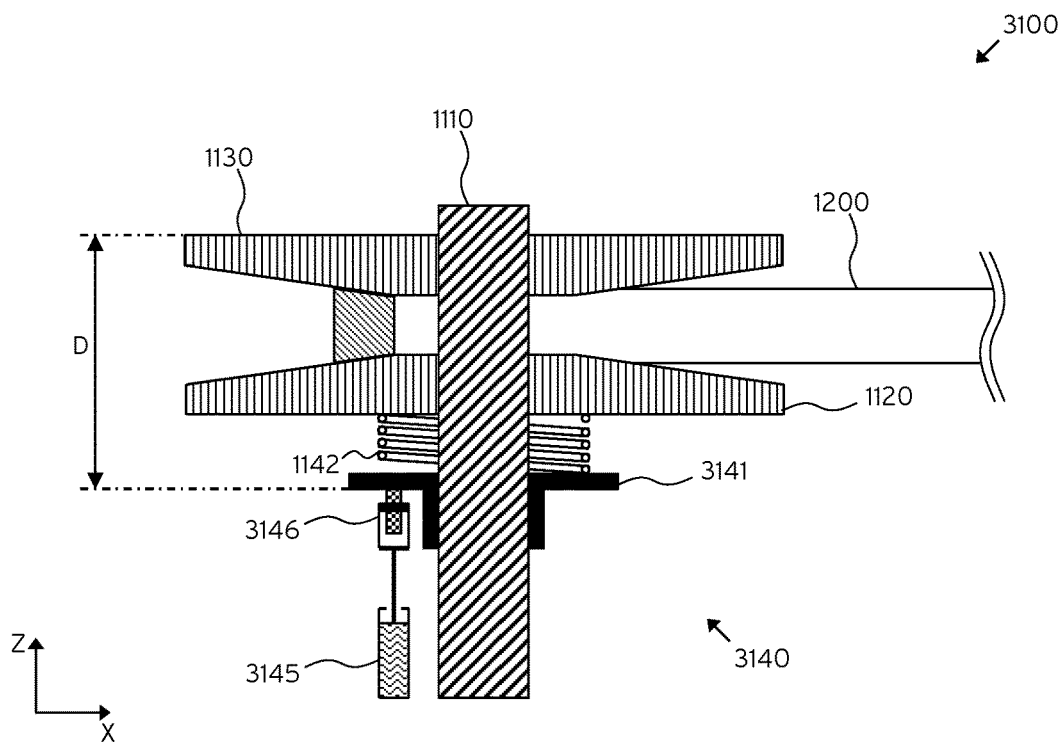
FIG. 7A schematically illustrates a section view of pre-loadable input elements of a continuously variable transmission in accordance with an embodiment of the present invention, in a lower gear and higher preload.
Figure 7B:
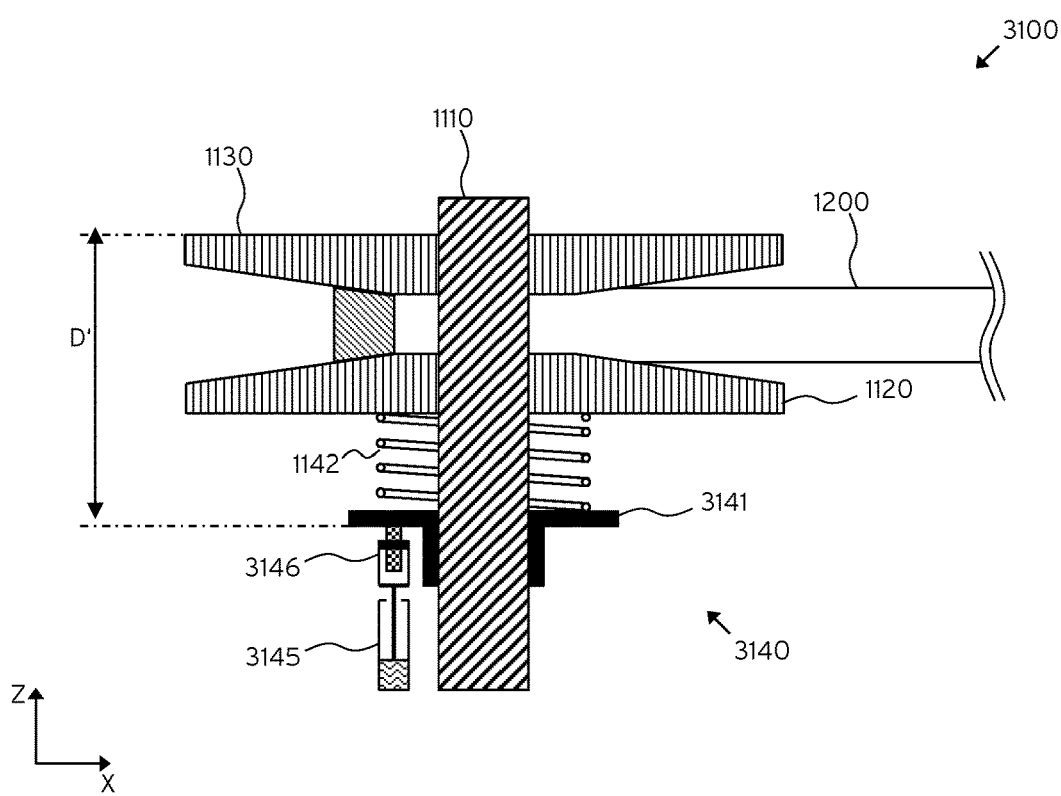
FIG. 7B schematically illustrates a section view of pre-loadable input elements of a continuously variable transmission in accordance with an embodiment of the present invention, in a lower gear and lower preload.

FIGS. 7A and 7B schematically illustrate a section view of preloadable input elements of a continuously variable transmission 1000, in accordance with an embodiment of the present invention. In particular FIG. 7A schematically illustrates a lower gear and higher preload while FIG. 7B schematically illustrates a lower gear and lower preload.

The preloadable input means 3100 differ from input means 1100 in that the preloadable input controlling means 3140 replace the input controlling means 1140. In particular, the preloadable input controlling means 3140 allow the positioning of the preloadable input plate 3141 along the input shaft 1110 to be controlled by means of a preloading means 3145.

In the embodiment illustrated in FIGS. 7A and 7B, the preloading means 3145 is schematically illustrated as a hydraulic pump pushing on the preloadable input plate 3141, eventually by placing a rolling means 3146, such as a wheel or a bearing, between the preloading means 3145 and the preloadable input plate 3141.

In this manner, the distance D between the preloadable input plate 3141 and the fixed input flange 1130 can be changed, as described with reference to the preloadable input controlling means 2140. However, since the preloading means 3145 can be implemented by a hydraulic or pneumatic pump, or by a cable, the preloading can be achieved remotely. It will be understood that, although not illustrated, a hydraulic or pneumatic connection to the preloading means 3145 can be connected to a corresponding hydraulic or pneumatic system. For instance, the preloading means 3145 could be operated as a slave cylinder controlled by a not illustrated master cylinder advantageously placed on the bicycle in a position reachable by the user. Although not illustrated, it will be understood by those skilled in the art that the positioning of the preloading means 3145 can be locked once the user has set a certain preload. For instance, in case of a hydraulic or pneumatic pump implementing the preloading means 3145, a non-return valve can be operated by the user so as to lock the preloading means 3145 in a given position.

Figure 8A:
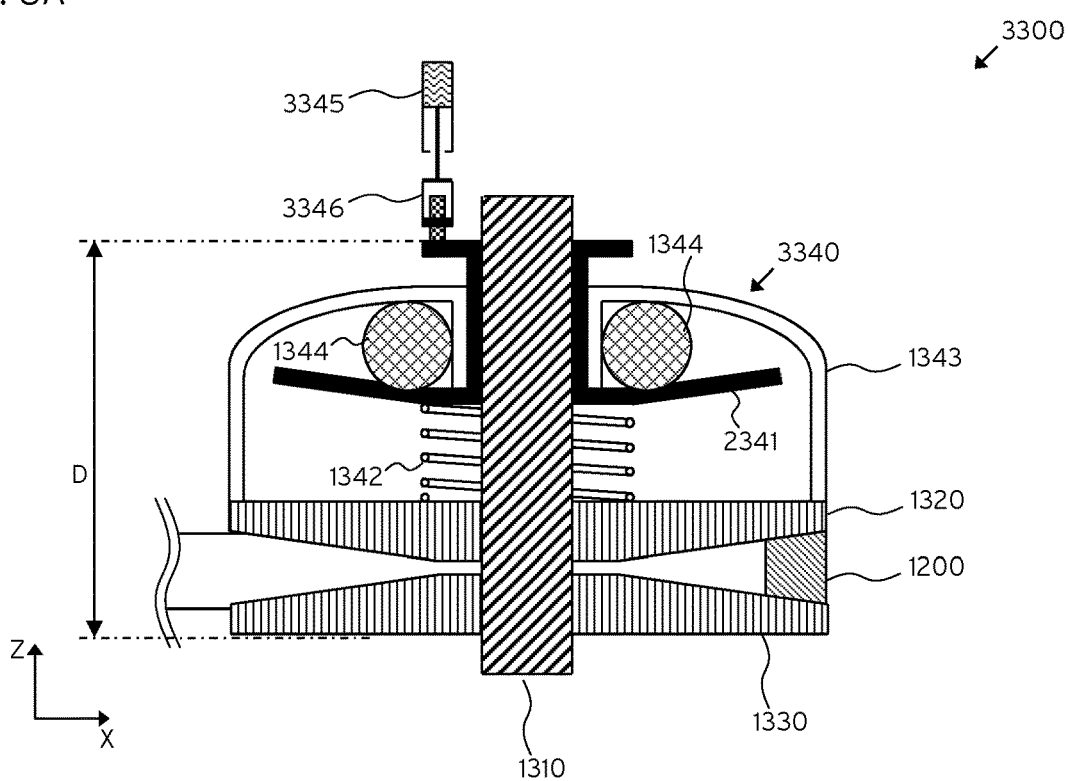
FIG. 8A schematically illustrates a section view of pre-loadable output elements of a continuously variable transmission in accordance with an embodiment of the present invention, in a lower gear and lower preload.
Figure 8B:
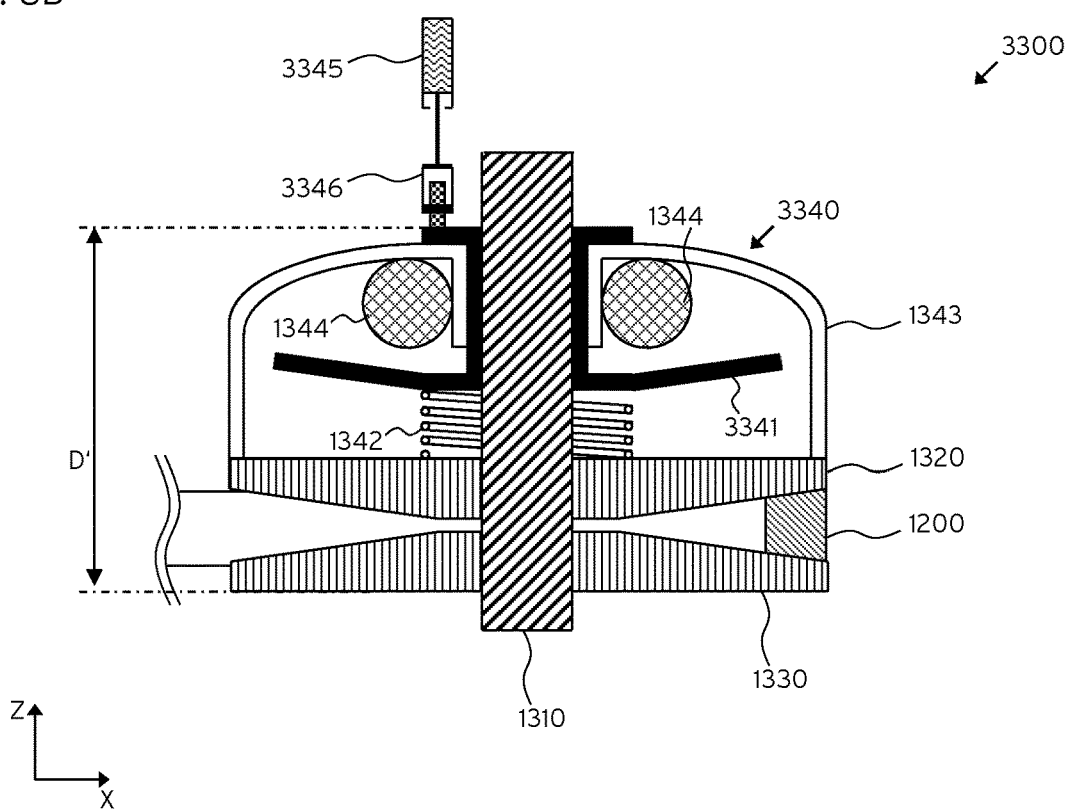
FIG. 8B schematically illustrates a section view of pre-loadable output elements of a continuously variable transmission in accordance with an embodiment of the present invention, in a lower gear and higher preload.

FIGS. 8A and 8B schematically illustrate a section view of preloadable output elements of a continuously variable transmission 1000, in accordance with an embodiment of the present invention. In particular FIG. 8A schematically illustrates a lower gear and lower preload while FIG. 8B schematically illustrates a lower gear and higher preload.

The preloadable output means 3300 differ from output means 1300 in that the preloadable output controlling means 3340 replace the output controlling means 1340. In particular, the preloadable output controlling means 3340 allow the positioning of the preloadable output plate 3341 along the output shaft 1310 to be controlled by means of a preloading means 3345, eventually through a rolling means 3346.

The operation of the preloading means 3345 and of rolling means 3346 are similar to those of the preloading means 3145 and of rolling means 3146 and the same considerations described for those means therefore apply here as well.

The embodiments described above allow a user to change the preload of the continuously variable transmission 1000, thereby resulting in control of the pedaling frequency. The possibility to remotely control the preload allows an additional degree of flexibility for the user.

By changing the preload, the continuously variable transmission 1000 however remains an automatic transmission where, once the preload is set, the gear ratio is constantly determined by the speed of the output means, due to the operation of the output actuating means 1344. Eventually, in some embodiments, with the proper combination of output actuating means 1344 and input and output elastic means 1142, 1342, the pedaling frequency can be substantially kept constant over a range of speed of the bicycle.

There may be, however, cases in which the user wishes to have a more active control in determining the gear ratio of the continuously variable transmission 1000. Embodiments allowing this additional degree of flexibility will be described below.

Figure 9A:
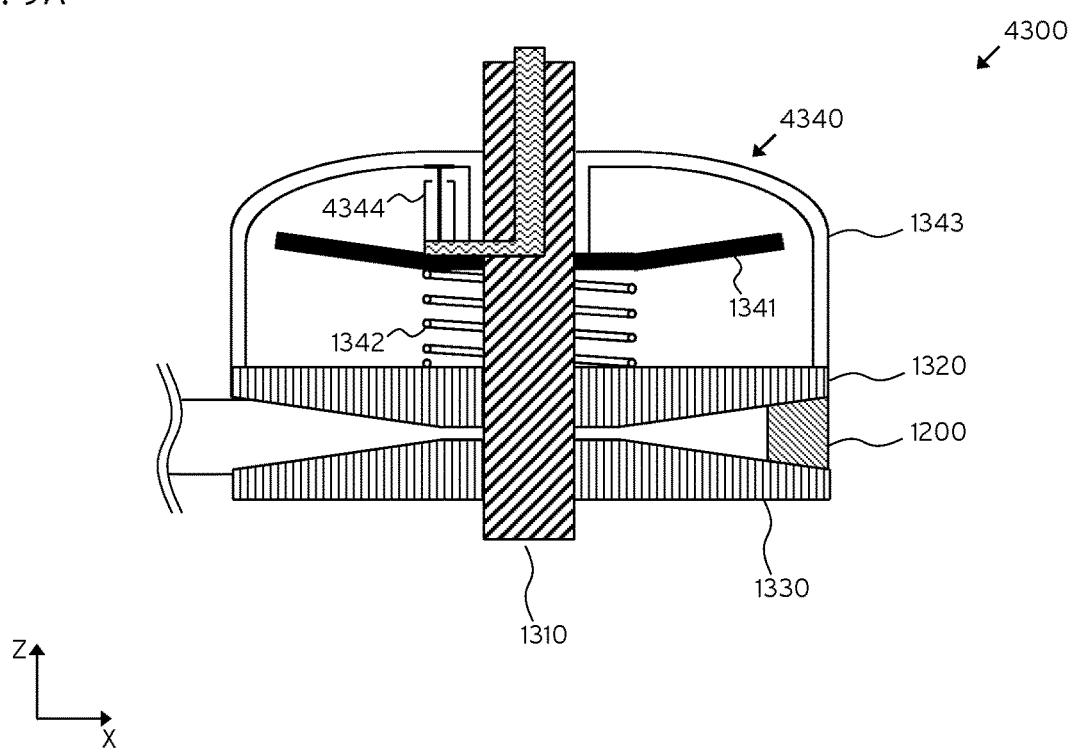
FIG. 9A schematically illustrates a section view of output elements of a continuously variable transmission in accordance with an embodiment of the present invention, in a lower gear.
Figure 9B:
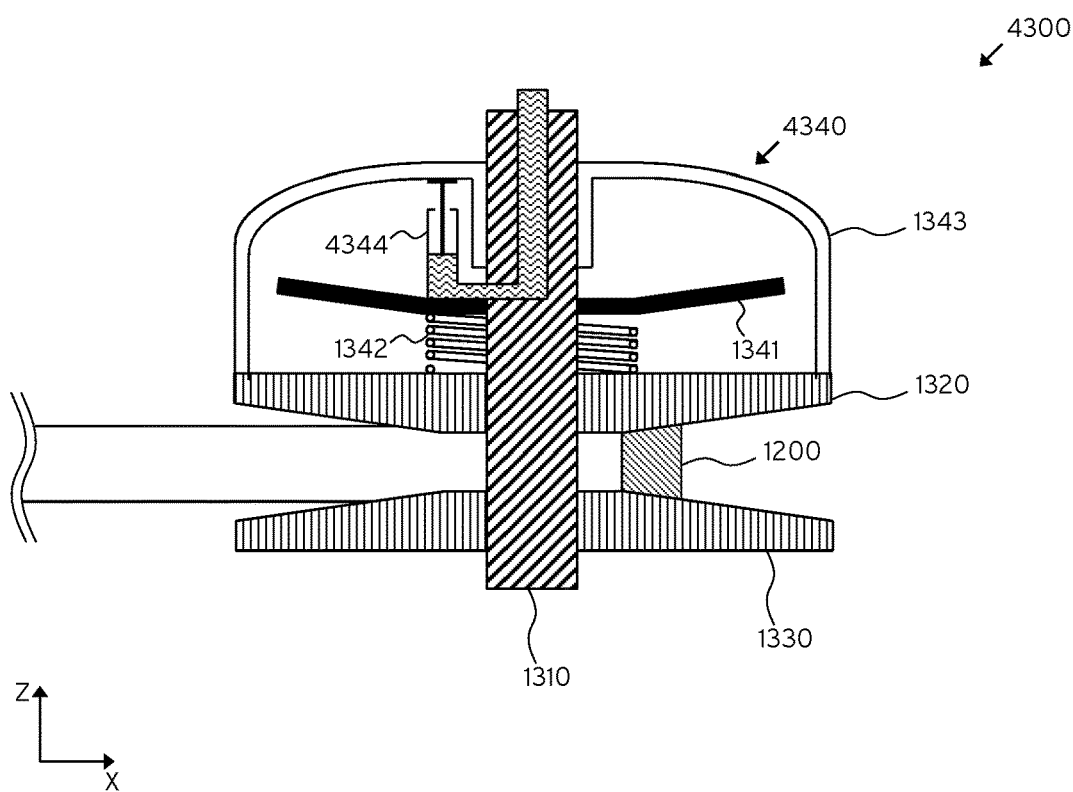
FIG. 9B schematically illustrates a section view of output elements of a continuously variable transmission in accordance with an embodiment of the present invention, in a higher gear.

FIGS. 9A and 9B schematically illustrate a section view of output elements of a continuously variable transmission 1000 in accordance with an embodiment of the present invention, allowing the user to control the gear ratio. In particular, FIG. 9A schematically illustrates the continuously variable transmission 1000 in a lower gear and FIG. 9B schematically illustrates the continuously variable transmission 1000 in a higher gear.

The output means 4300 of continuously variable transmission 1000 differ from output means 1300 in that they comprise output controlling means 4340 including output remotely controllable actuating means remotely controllable and replacing output actuating means 1344. In particular, in the illustrated embodiment, the output remotely controllable actuating means 4344 are illustrated as a hydraulic or pneumatic pump. However, they could be realized also by an electric motor, or a cable and a lever or cam, or any means capable of actuating the output means 4300 by moving the plate 1341 against the biasing force of the output elastic means 1342. In the case of a hydraulic or pneumatic pump, as illustrated, the hydraulic or pneumatic connection can be achieved through the output shaft 1310, so that the hydraulic or pneumatic connection to the output means 4300 can be achieved by proving an appropriate, non illustrated, rotatable connection means for connecting a non-illustrated, hydraulic or pneumatic feeding line to the output shaft 1310. A similar connection through the output shaft could be provided for a mechanical cable operation.

Thanks to the provision of the output remotely controllable actuating means 4344, the gear ratio of the output means 4300, and therefore of the continuously variable transmission 1000 can be remotely controlled by the user. In this manner the user can select, at any time, the desired gear ratio among an infinite continuous number of gear ratios, instead of being limited to a finite discrete number of ratios, such as in the sprocket type transmission.

It will be clear that, although described with reference to the output controlling means 4340, such remotely controllable actuating means 4344 can also be used at the input controlling means 1140. For instance, the output controlling means 1340 could be provided only with the output elastic means 1342 while the control of the gear of the transmission 1000 can be achieved by a remotely controllable actuating means similar to remotely controllable actuating means 4344 implemented at the input controlling means 1140.

The continuously variable transmission 1000 described above requires the output remotely controllable actuating means 4344 to be able to oppose the force exerted by the output elastic means 1342. This, in case of a particularly strong output elastic means 1342 could require the provision of multiplying means, such as a lever, for reducing the strength to be applied on the controlling means, for instance a master cylinder connected to the feeding line. This is particularly the case when the output remotely controllable actuating means 4344 are realized by means of a hydraulic or pneumatic pump.

In the case of an electric motor this requirement may be overcome by providing an electric motor powerful enough to counteract the bias of the output elastic means 1342. In some embodiments, the electric motor could still be made smaller, by requiring less power, thanks to the removal of the output elastic means 1342. This is illustrated in FIGS. 10A and 10B.

Figure 10A:
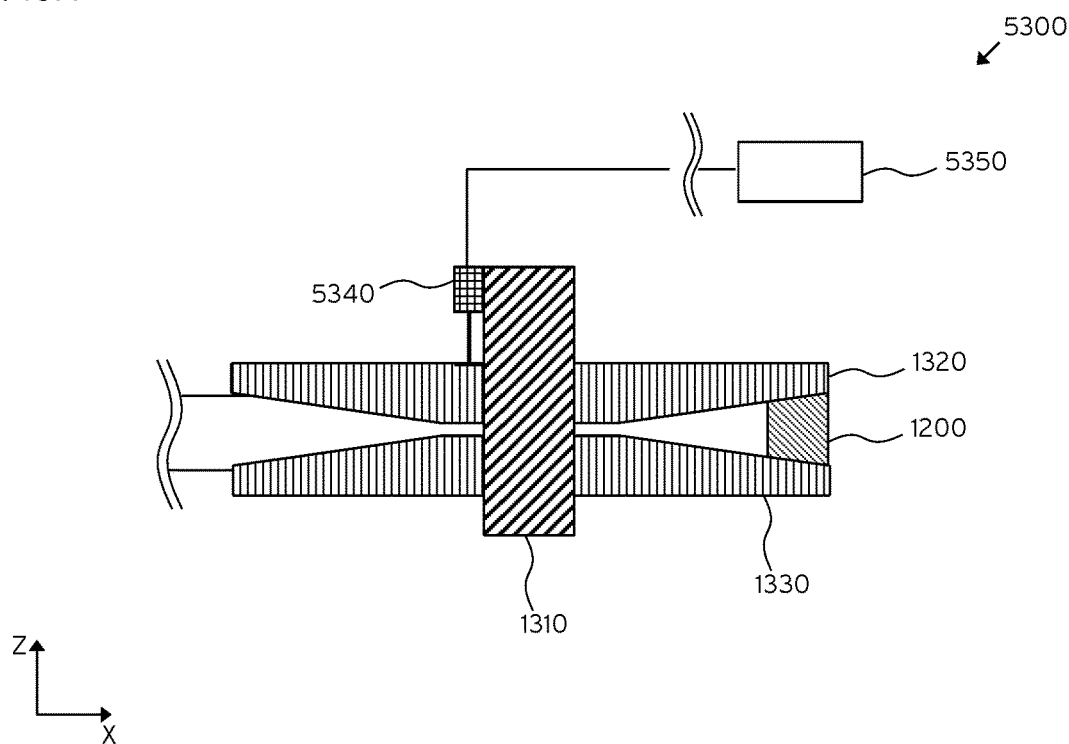
FIG. 10A schematically illustrates a section view of output elements of a continuously variable transmission in accordance with an embodiment of the present invention, in a lower gear.
Figure 10B:
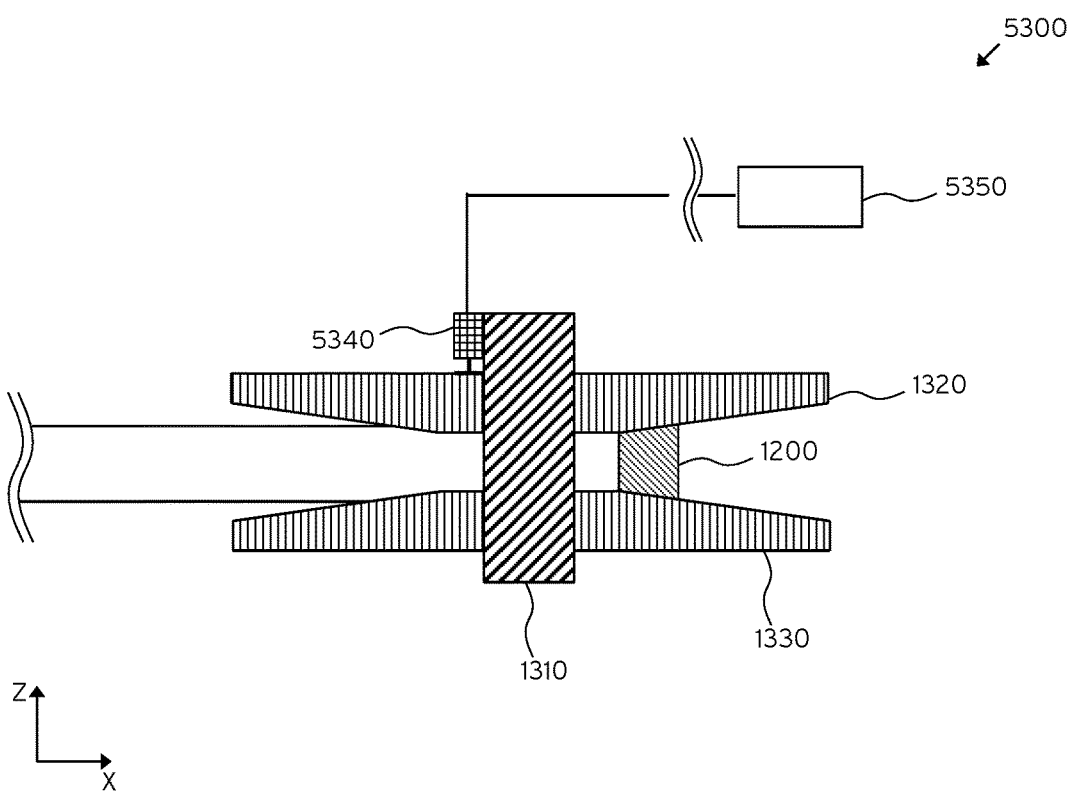
FIG. 10B schematically illustrates a section view of output elements of a continuously variable transmission in accordance with an embodiment of the present invention, in a higher gear.

In particular, FIGS. 10A and 10B schematically illustrate a section view of output elements of a continuously variable transmission 1000 in accordance with an embodiment of the present invention, in which the output controlling means 5340 is implemented by an electric motor or a transducer, or any other electrical position control device.

More specifically, FIG. 10A illustrates the continuously variable transmission 1000 in a lower gear and FIG. 10B schematically illustrates the continuously variable transmission 1000 in a higher gear.

The output means 5300 differ from output means 1300 in that the output controlling means 5340 does not have a mechanical control, such as in the embodiment of FIGS. 4A and 4B, but an electric control. This provides the beneficial advantage that the output elastic means 1342, the output flange 1341, and the case 1343 can be avoided and replaced by the output controlling means 5340, for instance an electric motor fixedly connected to the output shaft 1310.

The electric motor as output controlling means 5340 can precisely position the output flange 1320, so as to achieve the desired gear ratio. The control of the electric motor can be achieved by way of controlling means 5350.

In some embodiments, controlling means 5350 can be a control means which can be operated by the user, for instance a potentiometer or a PWM controller or a transistor, or any means capable of controlling the position of the output flange 1320 by operating the output controlling means 5340. This allows the user the flexibility to choose the desired gear ratio.

In some other embodiments, the controlling means 5350 can be a sensor, sensing a speed and controlling the output controlling means 5340. For instance the sensed speed can be that of the rear axle of the bicycle, or of the front or rear wheel, or of the output shaft 1310. In this manner, the controlling means 5350 can be programmed to increase the gear ratio of the continuously variable transmission 1000 as the sensed speed increases. This provides an automatic transmission that can achieve a behavior similar to that of the output means 1300. In addition, since the programming of the controlling means 5350, namely the relationship between the positioning of the output controlling means 5340 and the sensed speed, can be done electronically, a number of different behaviors of the continuously variable transmission can be obtained. For instance, a continuously variable transmission can be obtained in which the pedaling frequency is kept constant, at any speed of the bicycle. In other cases, the relationship between the sensed speed and the pedaling frequency can follow a predetermined curve. For instance at higher speeds a higher pedaling frequency can be preferred to make it easier for the rider to keep the higher speed.

Still alternatively, the relationship between the sensed speed and the positioning of the output controlling means 5340 can be controlled by an additional, not illustrated, electronic control. A controller provided to the user could allow the user to set a desired pedaling frequency, and the maintenance thereof at any speed can be obtained by taking into account the speed information obtained by the speed sensor. Additionally, a connection to a heartbeat-monitoring device can be implemented, in which the gear ratio is lowered, eventually more than once, when the heartbeat goes over a certain threshold or a plurality of subsequent thresholds. In this latter case, the user could select the thresholds for training purposes.

Still alternatively, in some embodiments, the user may want to temporarily lock the gear ratio in a simple mechanical manner instead of reverting to electronic or pneumatic implementations. This is allowed by the embodiment illustrated in FIGS. 11A and 11B.

Figure 11A:
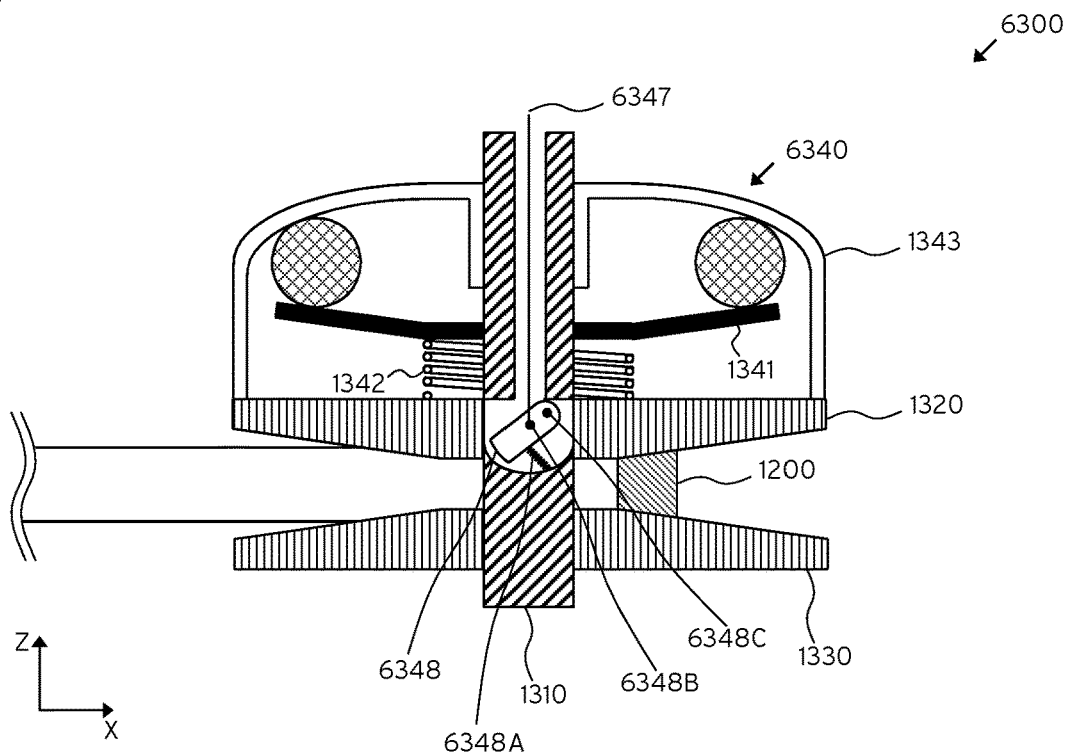
FIG. 11A schematically illustrates a section view of lockable output elements of a continuously variable transmission in accordance with an embodiment of the present invention, in an unlocked state.
Figure 11B:
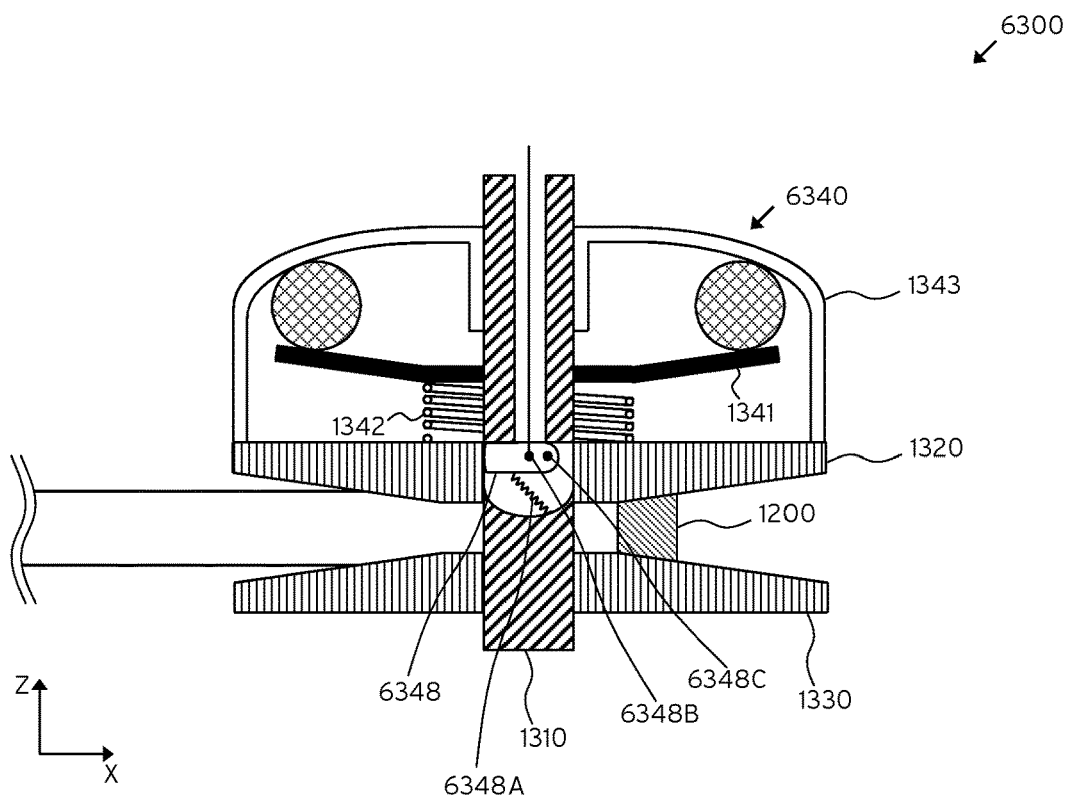
FIG. 11B schematically illustrates a section view of lockable output elements of a continuously variable transmission in accordance with an embodiment of the present invention, in a locked state.

In particular, FIG. 11A schematically illustrates a section view of lockable output elements of a continuously variable transmission 1000 in accordance with an embodiment of the present invention, in an unlocked state. FIG. 11B schematically illustrates a locked state of the continuously variable transmission 1000.

More specifically, the output controlling means 6340 differ from output controlling means 1340 by comprising a locking means 6348 for locking the position of the output controlling means 6340.

The locking means 6348 can be any means capable of locking the position of the output flange 1320 along the output shaft 1310. In the illustrated embodiment, for example, this is achieved by locking means 6348, for instance a cam within a section of output shaft 1310, capable of being moved so as to touch the flange 1320 from within output shaft 1310. In this manner, when the cam touches the flange 1320, the movement thereof along output shaft 1310 is prevented, as illustrated in FIG. 11B. On the other hand, when there is no contact between the cam and the flange 1320, the flange 1320 can move along output shaft 1310 under the influence of the output elastic means 1342 and of the output actuating means 1344. In the illustrated embodiment, the cam is biased toward the unlocked position by a biasing means 6348A, for instance a spring, and is actuated by actuating means 6347, for instance a cable or a pneumatic or hydraulic actuator. Finally, an actuating pivot 6348B allows the actuating means 6347 to be mechanically connected to the locking means 6348, while a rotation pivot 6348C allows the locking means 6348 to be rotated between the locked and the unlocked position.

Thanks to the above-described implementation, the user can temporarily lock the continuously variable transmission at a given gear ratio by remotely operating the actuating means 6347, for instance with a lever on the handlebar.

All of the above described continuously variable transmissions can be used by connecting the input shaft 1110 to the crankshaft of the bicycle and the output shaft 1310 to the rear axle of the bicycle. In this case, the rotational speed of the input and output means 1100, 1300 is comparable to that of the crankshaft and of the rear axle, respectively.

In some embodiments it may be desirable to have the input means 1100 and/or the output means 1300 rotating at a higher speed. This can be particularly advantageous in cases where the output means 1300 are controlled in a mechanical manner, such as illustrated, for instance, in the embodiment of FIGS. 4A and 4B. In particular, by providing a higher rotational speed of the output controlling means 1340, the weight and size of the output actuating means 1344 can be advantageously reduced.

In order to provide such a higher rotation of the input means 1100 and/or of the output means 1300, it is possible to provide a multiplying transmission at the input means 1100 and/or the output means 1300. Such embodiments will be described below with reference to FIGS. 12A, 12B, 13A and 13B.

Figure 12A:
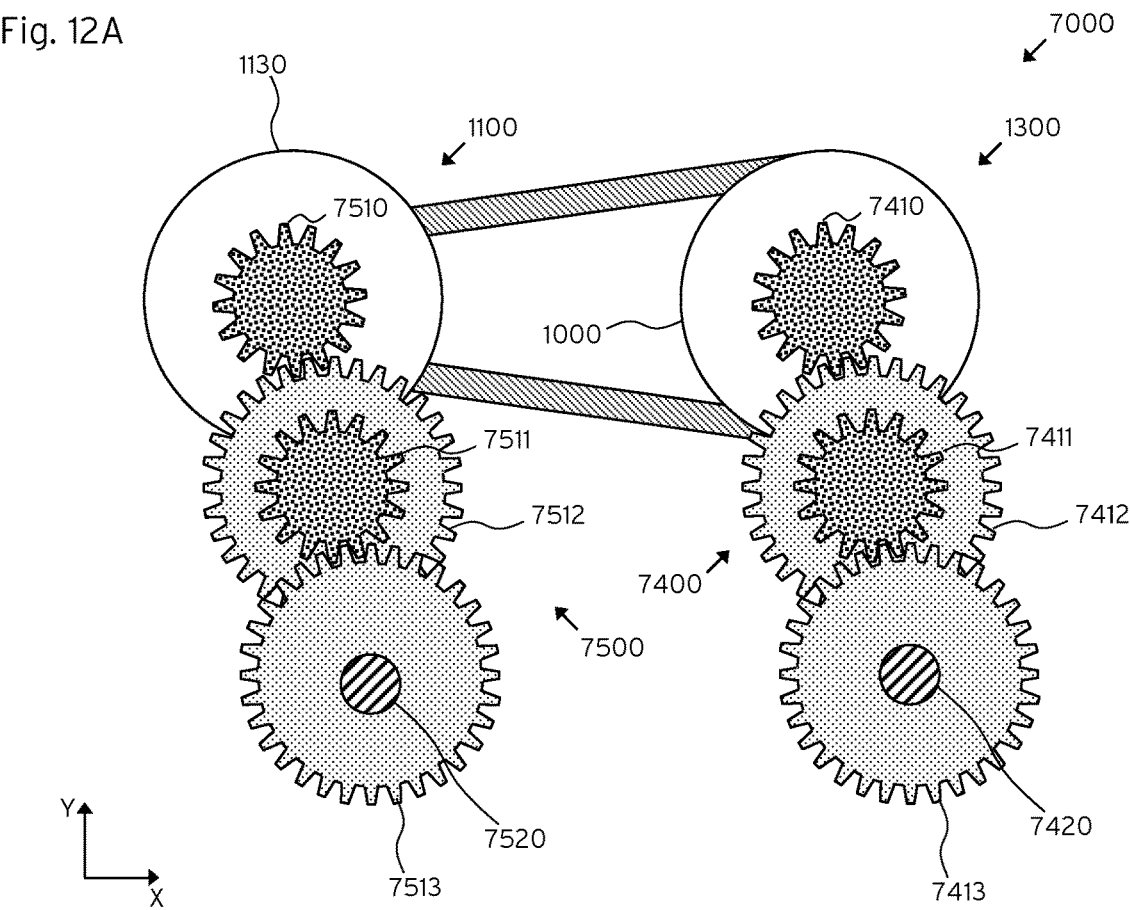
FIG. 12A schematically illustrates a side view of elements of a continuously variable transmission in accordance with an embodiment of the present invention.
Figure 12B:
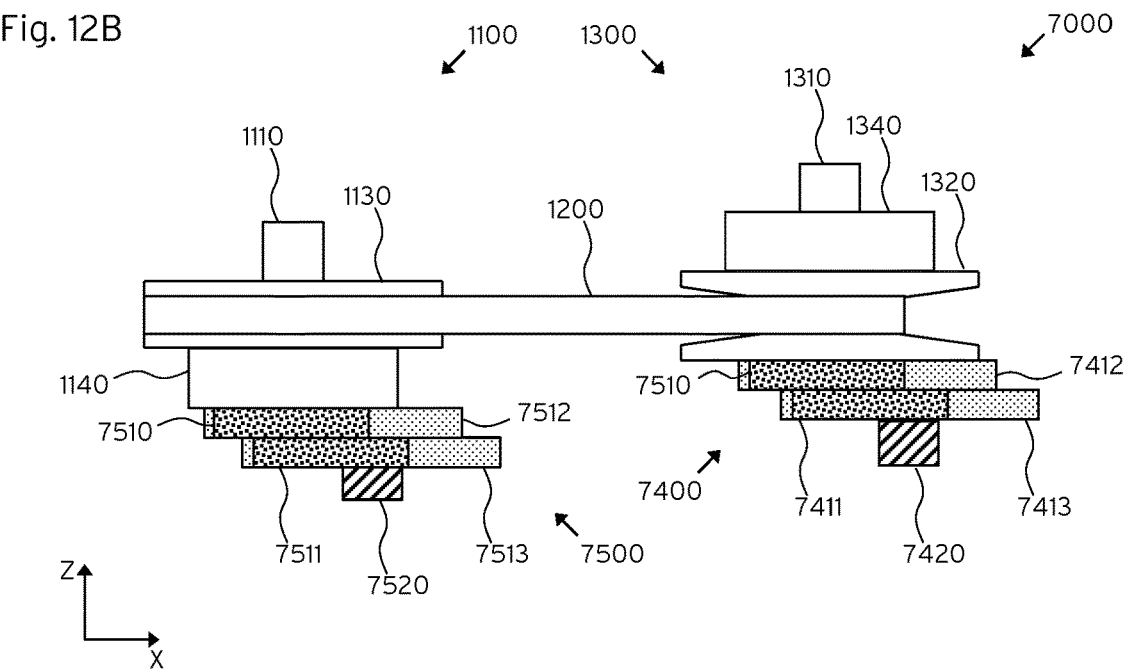
FIG. 12B schematically illustrates a top view of the embodiment of FIG. 12A.

FIG. 12A schematically illustrates a side view of elements of a continuously variable transmission 7000 in accordance with an embodiment of the present invention. FIG. 12B schematically illustrates a top view of the embodiment of FIG. 12A.

The continuously variable transmission 7000 differs from continuously variable transmission 1000 due to the provision of the input multiplying means 7500 and/or the output multiplying means 7400. In general, multiplying means can be implemented by any means capable of making the input or output means 1100, 1300 rotating faster than the crankshaft and rear axle, respectively. They could therefore be implemented by pulleys, gears, cardan shaft or similar elements. In the embodiments illustrated, gears have been shown for ease of illustration, however the present invention is not limited thereto.

In particular, input multiplying means 7500 comprises gears 7510-7513 and an input shaft 7520. The input shaft 7520 is fixedly connected to larger gear 7513, actuating smaller gear 7511. Smaller gear 7511 is fixedly connected to larger gear 7512, itself actuating smaller gear 7510, fixedly connected to the input shaft 1110 of the input means 1100. In this manner, the input shaft 1110 of the input means 1100 rotates faster than input shaft 7520 of the input multiplying means 7500. Output multiplying means 7400 operate in a similar manner by means of gears 7410-7413 and output shaft 7420.

In some embodiments, the input multiplying means 7500 can have a multiplying factor in the range of 5-30, preferably in the range of 10-15. In some embodiments, the output multiplying means 7400 can have a multiplying factor lower than the multiplying factor of the input multiplying means 7500. In particular, the output multiplying means 7400 can have a multiplying factor in the range of 2-10, preferably in the range of 3-6.

Thanks to those values, the continuously variable transmission can also advantageously have a preset multiplication factor given by the ratio of the multiplying factor of the input multiplying means 7500 to the multiplying factor of the output multiplying means 7400. This also advantageously allows using more effectively the continuously variable transmission 7000, as the ratio of the continuously variable transmission 7000 can advantageously be multiplied by such preset multiplication factor.

In some embodiments, the total mass of the weights acting as output actuating means 1344 can be selected in the range of 100 to 500 grams, preferably 140 to 300 grams. This is particularly advantageous in combination with the above described multiplication factors, as it allows the output means 1300 to operate at a rotational speed in the range of 300 to 4,000 rpm preferably in the range from 400 to 2000 rpm.

In some embodiments, the diameter of the pulleys of the input means 1100 and of the output means 1300 can be in the range of 20 mm to 120 mm. This size combines advantageously with the above-described total mass of the weights and multiplication factors in providing an effective continuously variable transmission 7000. Moreover, this size also allows a compact realization of the continuously variable transmission 7000.

Moreover, torque applied to the transmission means 1200 from the pulley of the input means 1100 and 1300 is reduced thanks to the presence of the multiplying means 7400 and 7500. This means that, for the same pedal force, the minimum wrap diameter of the transmission means 1200 around the input means 1100 and/or output means 1300 also decreases, thus allowing a smaller continuously variable transmission, thereby advantageously reducing the total mass.

Although four gears 7410-7413 and 7510-7513 have been illustrated, it will be clear to those skilled in the art that any number of gears can be used, as long as a multiplying effect can be achieved. Additionally, although output gears 7410-7413 and input gears 7510-7513 are illustrated as being substantially symmetrical, the present invention is not limited thereto and the input multiplying means 7500 and the output multiplying means 7400 could be realized differently from each other.

Thanks to the multiplying effect of the input multiplying means 7500 and/or the output multiplying means 7400, the weights acting as output actuating means 1344 can be made smaller, and/or the input and/or the output elastic means 1142, 1342, can be smaller. Additionally, also the size of the transmission means 1200, and more in general the size of all components of the continuously variable transmission 7000, can be made smaller, as the forces acting on the continuously variable transmission 7000 are reduced. Thus, even if multiplying means are added to the continuously variable transmission 7000 with respect to the continuously variable transmission 1000, the continuously variable transmission 7000 could be smaller and/or lighter than the continuously variable transmission 1000. Additionally the multiplying effect reduces the torque applied between flanges 1120 and 1330 to transmission means 1200.

Figure 13A:
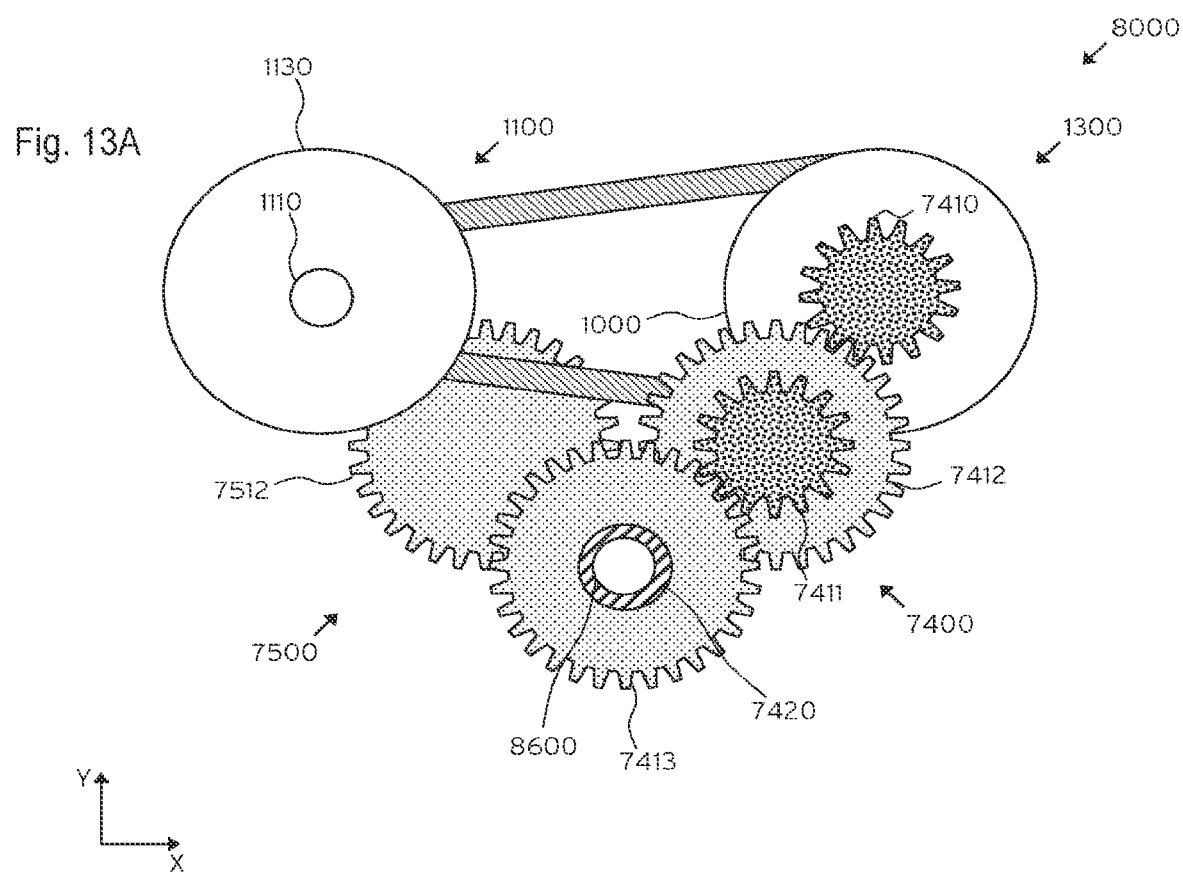
FIG. 13A schematically illustrates a side view of elements of a continuously variable transmission in accordance with an embodiment of the present invention.
Figure 13B:
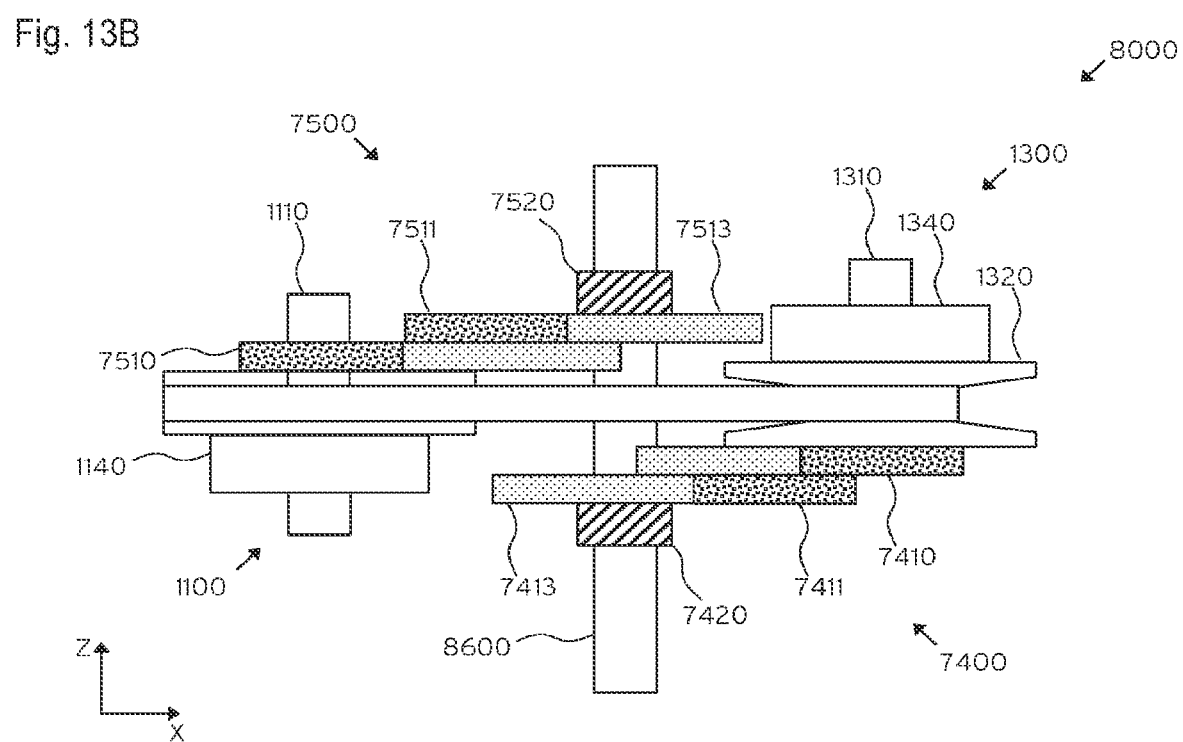
FIG. 13B schematically illustrates a top view of the embodiment of FIG. 12A.

FIG. 13A schematically illustrates a side view of elements of a continuously variable transmission 8000 in accordance with an embodiment of the present invention. FIG. 13B schematically illustrates a top view of the embodiment of FIG. 12A.

Continuously variable transmission 8000 differs from continuously variable transmission 7000 in that the input multiplying means 7500 and the output multiplying means 7400 are placed on opposite sides of the input means 1100 and of the output means 1300. Alternatively, or in addition, continuously variable transmission 8000 differs from continuously variable transmission 7000 in that the gears 7413 and 7513 are co-axial. Alternatively, or in addition, continuously variable transmission 8000 differs from continuously variable transmission 7000 in that the gears 7413 and 7513 are co-axial with the crankshaft.

The positioning of the input multiplying means 7500 and the output multiplying means 7400 on opposite sides of the input means 1100 and of the output means 1300 allows a more compact form of the continuously variable transmission 8000, as the gears can at least partially overlap in the ZY plane, as illustrated in FIG. 13A. The co-axial positioning of the gears 7413 and 7513 allows the dimensions of the continuously variable transmission 8000 to be further contained and, when the axis of the gears 7413, 7513 also corresponds to the bicycle's crankshaft axis, an even more compact form can be obtained, and a connection of the crankshaft 8600 to the input shaft 7520 can be simplified.

In this latter case, although not illustrated for ease of illustration, it will be clear to those skilled in the art that the output shaft 7420 can freely rotate on the crankshaft 8600, while the input shaft 7520 can be fixedly connected to the crankshaft 8600. The connection of the output shaft 7420 to the rear axle of the bicycle can be achieved by any transmission, such as a belt, a chain, a cardan shaft, or similar.

As can be seen in FIG. 13B, the continuously variable transmission 8000 advantageously has a substantially triangular shape with a bottom apex corresponding to the crankshaft 8600. This is particularly advantageous, since it matches the substantially triangular shape of the bottom bracket of a bicycle frame, and therefore allows for an ideal integration of the continuously variable transmission 8000 into a bicycle frame, eventually by using part of the frames as supporting point for some of the elements of the continuously variable transmission 8000.

It will be clear to those skilled in the art that, although continuously variable transmissions 7000 and 8000 have been described with reference to input and output means 1100 and 1300, the present invention is not limited thereto. Alternatively, any input means described above can be combined with any output means described above and the resulting combination can be implemented in any of continuously variable transmissions 1000, 7000 or 8000.

Some embodiments of the present invention also relate to a bicycle comprising any of the above-described continuously variable transmissions 1000, 7000 or 8000. The placement of the continuously variable transmission on the bicycle is not limited, as long as it allows the transmission to be connected, eventually by means of other transmission means such as chains or belts, to the crankshaft and to the rear axle.

In the following embodiments some particularly advantageous positioning of the continuously variable transmission will be described.

Figure 14:
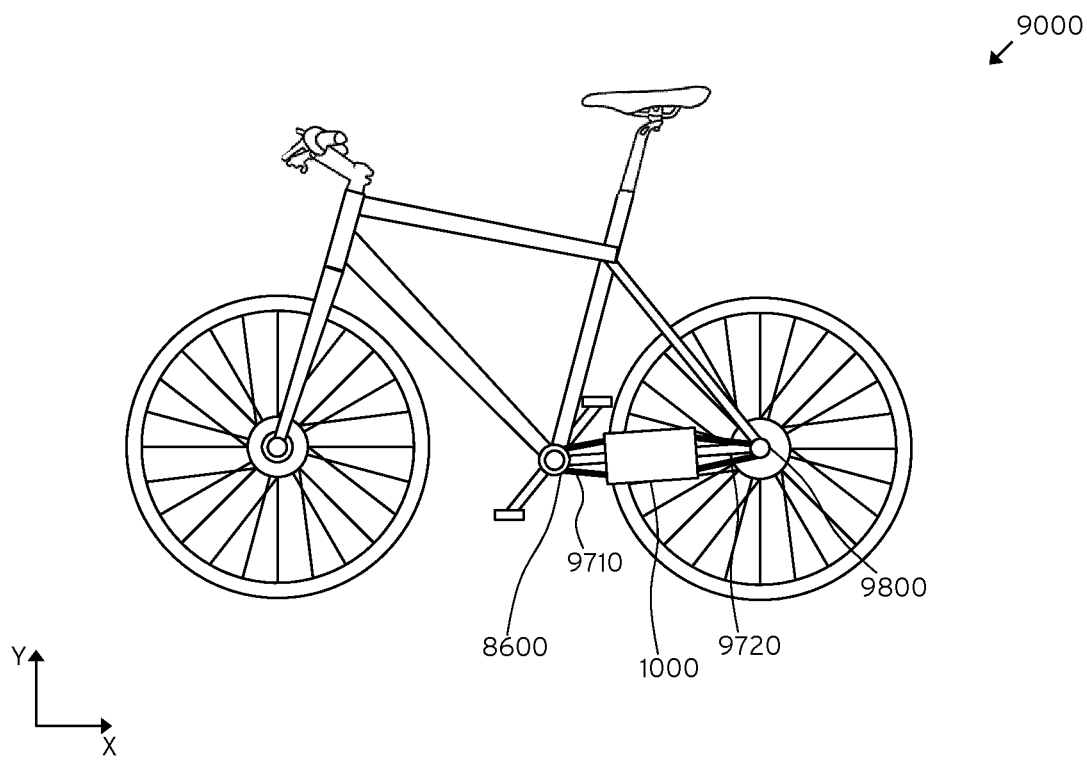
FIG. 14 schematically illustrates a side view of elements of a bicycle in accordance with an embodiment of the present invention.

In particular, FIG. 14 schematically illustrates a side view of elements of a bicycle in accordance with an embodiment of the present invention. More specifically, bicycle 9000 comprises a crankshaft 8600, a rear axle 9800, and any of the above described continuously variable transmissions. In the illustrated example, only for clarity of illustration, the continuously variable transmission 1000 has been referenced.

The continuously variable transmission is placed substantially between the rear axle 9800 and the crankshaft 8600. This allows moving the weight of the continuously variable transmission toward the center of the bike, thus obtaining a better handling and avoiding an increase in unsprung weight on the rear axle in the situation that the bicycle has rear suspension.

The input means 1100 of the continuously variable transmission 1000 are connected, eventually with a first transmission 9710, to the crankshaft. Similarly, the output means 1200 are connected, eventually with a second transmission 9720, to the rear axle. Any of the first and/or second transmission 9710, 9720 could be any of a chain, gears, a transmission shaft, a belt, etc. Alternatively, or in addition, any of the first and/or second transmission 9710, 9720 could provide a multiplying effect, thus realizing the above described input multiplying means 7500 and output multiplying means 7400. That is, first transmission 9710 can have a first transmission ratio causing the input means 1100 or the input shaft 1110, 7520 to rotate faster than the crankshaft 8600, and/or the second transmission 9720 can have a second transmission ratio causing the output means 1300 or the output shaft 1310, 7420 to rotate faster than the rear axle 9800.

In particular, the multiplying means can be obtained by any combination of the multiplying means described with reference to FIGS. 12A-13B, the first transmission 9710 and/or the second transmission.

Figure 15:
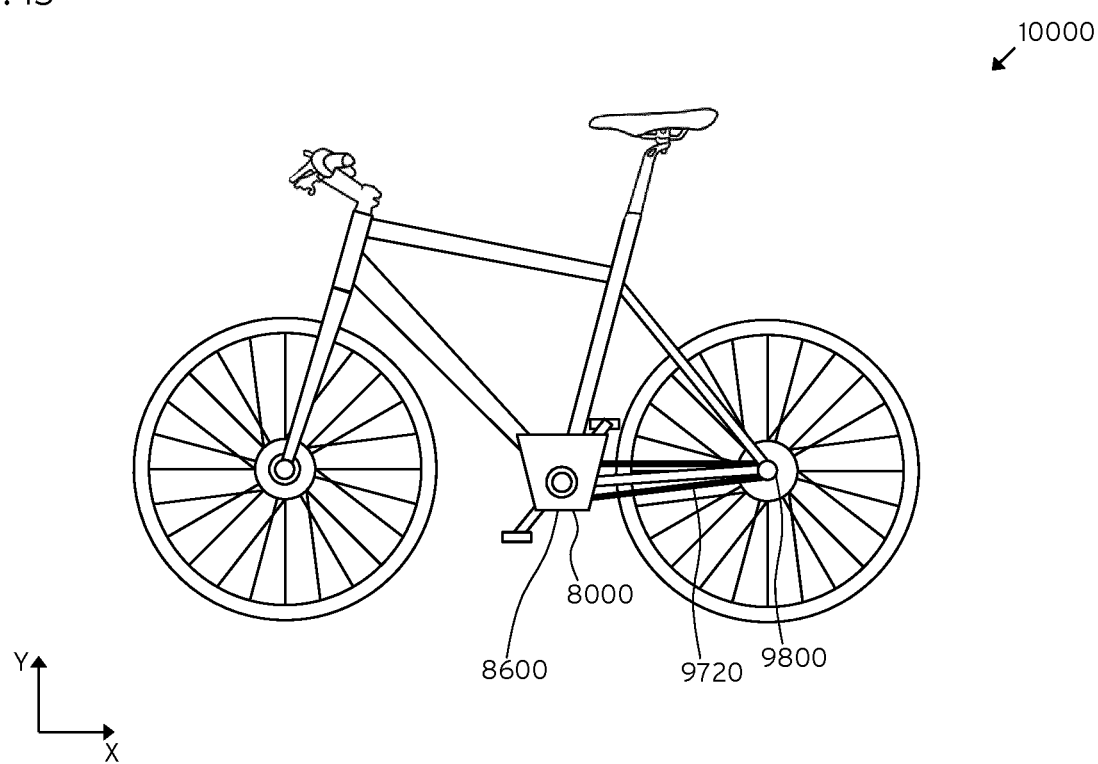
FIG. 15 schematically illustrates a side view of elements of a bicycle in accordance with an embodiment of the present invention.

For instance, FIG. 15 schematically illustrates a side view of elements of a bicycle in accordance with an embodiment of the present invention. In particular, bicycle 10000 comprises a crankshaft 8600, a rear axle 9800, and any of continuously variable transmission 1000, 7000 or 8000. Although illustrated as a street bicycle, it will be clear that the bicycle 10000 can be any type of bicycle, such as a race bicycle, a mountain-bike, or an exercise bicycle, such as a stationary bicycle.

By positioning the continuously variable transmission 1000, 7000 or 8000 substantially in correspondence with the crankshaft 8600, it is possible to connect the crankshaft 8600 to the input shaft 1100, or to the input shaft 7520, either in a direct manner as illustrated, or with a first transmission, such as first transmission 9710. Similarly, the output shaft 1300 or 7420 is connected, eventually with a second transmission 9700, to the rear axle 9800.

In the illustrated example, the input shaft 1110 or 7520 can be directly connected to the crankshaft. The input multiplying means could be obtained as described with reference to FIGS. 12A-13B. The output multiplying means could be obtained as described with reference to FIGS. 12A-13B, eventually in combination with a multiplying effect given by the characteristics of the second transmission 9720.

Still alternatively, any of the above-described continuously variable transmission could be placed substantially at the rear axle 9800. For instance, the rear axle 9800 could be connected to the output shaft 7420 or 1310.

Figure 16:
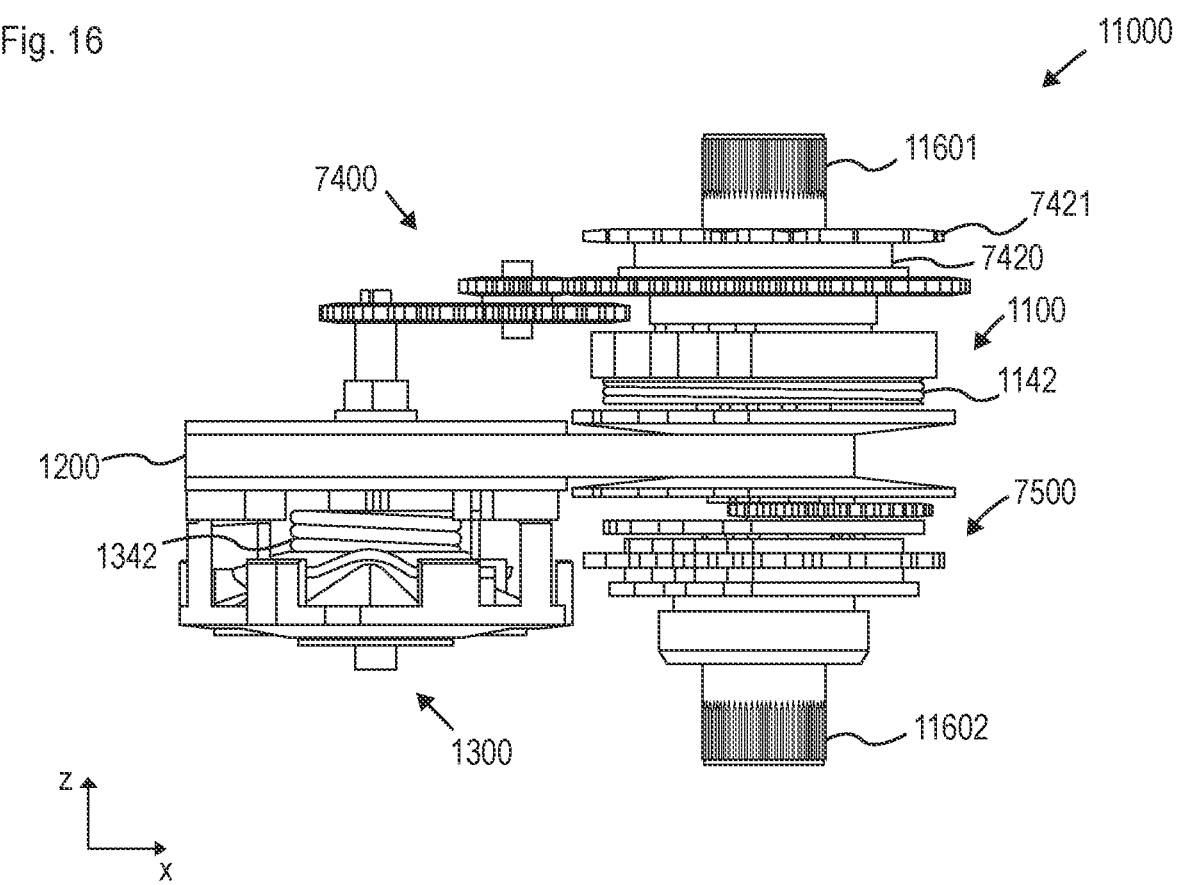
FIG. 16 schematically illustrates a top view of elements of a continuously variable transmission in accordance with an embodiment of the present invention.

FIG. 16 schematically illustrates a top view of elements of a continuously variable transmission 11000 in accordance with an embodiment of the present invention.

As can be seen in FIG. 16, the continuously variable transmission 11000 comprises input means 1100 and output means 1300. The input means 1100 are substantially coaxial with the crankshaft 8600, but are not directly connected thereto. Instead, the crankshaft 8600, eventually provided with a smaller diameter section in the part thereof, on which the input means 1100 are located, advantageously provides a support, on which the input means 1100 are free to rotate, for instance by means of a bearing. In this respect, the parts of the crankshaft 8600 with a larger diameter can be identified by two semi-crankshafts 11601 and 11602. The remaining portion of the crankshaft 8600, potentially having a smaller diameter, between semi-crankshafts 11601 and 11602 is not visible in the drawing due to the presence of the continuously variable transmission 11000. However, it will be understood that the two semi-crankshafts 11601 and 11602 are connected to each other.

In this embodiment, similarly to the continuously variable transmission 7000 and 8000, an input multiplying means 7500 is provided between the input shaft, in this case the crankshaft 8600, and the input means 1100. Even more specifically, in the illustrated embodiment, the semi-crankshaft 11602 is connected to the input multiplying means 7500 by means of a locking portion 11603. In particular, the locking portion 11603 locks the first gear of the input multiplying means 7500 to the semi-crankshaft 11602, so as to transfer the torque from the crankshaft 8600 to the input multiplying means 7500. In this respect, the semi-crankshaft 11602 advantageously acts as input shaft 7520, thereby reducing the number of components, and obtaining a compact and light continuously variable transmission 11000.

The input multiplying means 7500 comprises several gears, advantageously placed in the Z direction between the locking portion 11603 and the input means 1100. It will be clear that the specific relative positioning of the gears can be implemented in several ways. By placing the input multiplying means 7500 in this position, it is possible to advantageously use the standard width of the crankshaft 8600 for positioning the input multiplying means 7500 and the input means 1100, thereby obtaining a particularly compact continuously variable transmission 11000.

The torque from the input means 1100 is transferred to the output means 1300 via the transmission means 1200, as previously described. The output means 1300 is generally thicker, in the Z direction, than the input means 1100. By placing, as illustrated, the input multiplying means 7500 on the side of the input means 1100, the size in the Z direction of the output means 1300 and of the combination of the input multiplying means 7500 and of the input means 1100 becomes substantially similar, thus optimizing the distribution of the components and thereby obtaining a particularly compact continuously variable transmission 11000.

The output means 1300 in this embodiment operates substantially as the output means 6300, previously described. In addition, an output multiplying means 7400 is provided, so as to obtain the respective advantages previously described. In the illustrated embodiment, the output multiplying means 7400 has an output shaft 7420, which is also substantially coaxial with the crankshaft 8600 and rotates freely on the latter by means, for instance, of a bearing, not visible in the drawing. The advantage of this approach is that an output sprocket 11421, preferably of customary bicycle dimensions, can be mounted on the output shaft 7420, so as to attach a classic chain for connection to a sprocket on the backwheel. Moreover, the mounting of the output shaft 7420 on the crankshaft 8600 provides stability to the output shaft 7420, without requiring any support element other than the crankshaft 8600, which is already present, so that weight and dimensions of the continuously variable transmission 11000 can be contained. It will however be clear that the output shaft 7420 and also be realized in another location of the continuously variable transmission 11000.

The illustrated embodiment has a dimension, in the Z direction, of the combination of input multiplying means 7500, input means 1100 and output shaft 7420 which is within the range of the customary distance between bicycle pedals, thereby providing a very compact continuously variable transmission 11000 which can advantageously fit in the standard bicycle pedal hub thickness.

Moreover, as the two axel system of the continuously variable transmission is compact, particularly in the Z direction, it can reduce aerodynamic drag on the bicycle when cycling at speed. Furthermore, using only two axle instead of three, as for instance in the continuously variable transmission 8000, the number of components can be reduced, thereby reducing costs, weight and dimensions.

Figure 17:
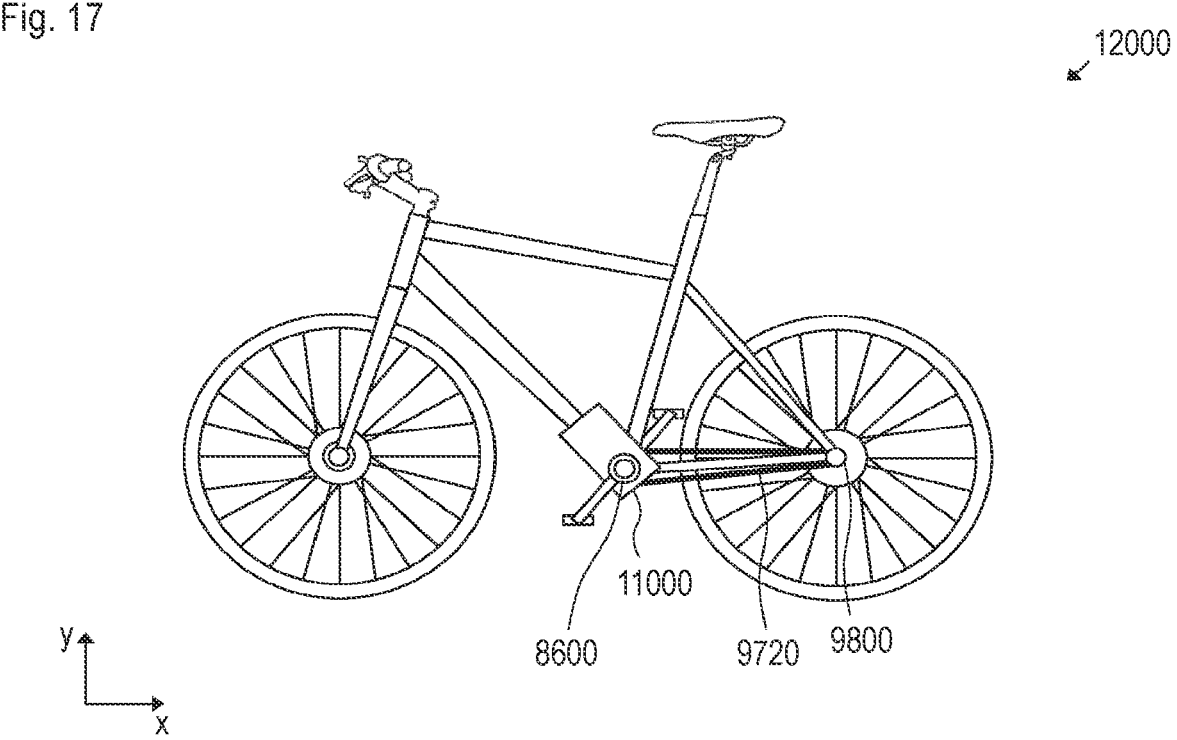
FIG. 17 schematically illustrates a side view of elements of a bicycle in accordance with an embodiment of the present invention.

FIG. 17 schematically illustrates a side view of elements of a bicycle 12000 in accordance with an embodiment of the present invention. More specifically, bicycle 1200 comprises the continuously variable transmission 11000. As can be seen, the advantageous form factor of the continuously variable transmission 11000 with the input shaft and output shaft substantially coaxial with the crankshaft 8600 allows the continuously variable transmission 11000 to be mounted at the pedal hub and extend in the direction of the frame toward the handlebar. This is particularly advantageous, since this part of the frame usually free, even in bicycles with suspensions, and thereby allows the continuously variable transmission 11000 to be fitted to a large variety of bicycles.

In the case of an exercise bicycle the invention is also particularly advantageous, as it allows the user to perform a physical exercise with a substantially constant effort. With a standard exercise bicycle it may be difficult for the user to judge precisely how much force he or she is exerting, and he or she may thus accidentally apply too much force or not enough force. When used for training or for recovery, for instance after an accident, the possibility to precisely control the force applied by the user on the pedals is very beneficial, as it allows the trainer or doctor to precisely control how much effort the user should or can exert.

Although several embodiments have been separately described above, for clarity of exposition, it will be clear to those skilled in the art that any features of any of the described embodiments can be used in combination of any features of any other of the described embodiments, within the scope of the invention as defined by the claims.

LIST OF REFERENCE NUMERALS

1000: continuously variable transmission
1100: input means
1110: input shaft
1120: first input flange
1130: second input flange
1140: input controlling means
1141: input plate
1142: input elastic means
1200: transmission means
1300: output means
1310: output shaft
1320: first output flange
1330: second output flange
1340: output controlling means
1341: output plate
1342: output elastic means
1343: case
1344: output actuating means
2100: preloadable input means
2140: preloadable input controlling means
2141: preloadable input plate
2145: preloading means
2300: preloadable output means
2341: preloadable input plate
2345: preloading means
3100: preloadable input means
3140: preloadable input controlling means
3141: preloadable input plate
3145: preloading means
3146: rolling means
3300: preloadable output means
3340: preloadable output controlling means
3345: preloading means
3346: rolling means
4300: output means
4340: output controlling means
4344: output remotely controllable actuating means
5300: output means
5340: output controlling means
5350: controlling means
6300: lockable output means 6347: actuating means
6348: locking means
6348A: biasing means
6348B: actuating pivot
6348C: rotation pivot
7000: continuously variable transmission
7400: output multiplying means
7410-7413: gear
7420: output shaft
7500: input multiplying means
7510-7513: gear
7520: input shaft
8000: continuously variable transmission
8600: crankshaft
9000: bicycle
8600: crankshaft
9710: transmission
9720: transmission
9800: rear axle
10000: bicycle
11000: continuously variable transmission
11421: output sprocket
11601, 11602: semi-crankshaft
11603; locking portion
12000: bicycle

The invention claimed is:

1. A continuously variable transmission for a bicycle comprising:
 at least one input unit including at least one input shaft;
 at least one output unit including at least one output shaft and at least one output controlling unit configured to control a gear ratio of said output unit;
 a locking unit configured to lock a position of said output controlling unit;
 at least one transmission unit connecting said input unit and said output unit, said transmission unit including at least one belt;
 an input multiplying unit configured to multiple a rotational speed of said input unit with respect to said input shaft; and
 an output multiplying unit configured to multiple a rotational speed of said output unit with respect to said output shaft,
 wherein said locking unit includes a cam associated in a section of said output shaft, said cam having a configuration capable of moving between at least a first position and a second position, wherein said second position has said cam contacting a portion of said output unit that prevents movement thereof along said output shaft, and
 wherein said actuating unit is connectable to said cam by way of a first pivot, and wherein said cam is connectable to said output shaft by way of a second pivot configured to allow said cam to rotate between the first and second positions.

2. A V-belt type continuously variable transmission for a bicycle comprising:
 input means (1100) comprising a first input flange (1120), a second input flange (1130) and a first input shaft (1110), at least one of the first input flange (1120) and second input flange (1130) being movable on the first input shaft (1110) in an axial direction so as to vary the distance between the first input flange (1120) and second input flange (1130);
 output means (1300) comprising a first output flange (1320), a second output flange (1330) and a first output shaft (1310), at least one of the first output flange (1320) and second output flange (1330) being movable on the first output shaft (1310) in an axial direction so as to vary the distance between the first output flange (1320) and second outout flange (1330);
 transmission means in the form of a V-shaped belt connecting the input means (1100) to the output means (1300);
 a second input shaft (7520) and a second output shaft (7420);
 input multiplying means (7510, 7511, 7512, 7513) multiplying a rotational speed of the input means (1100) with respect to the second input shaft (7520); and
 output multiplying means (7410, 7411, 7412, 7413) multiplying a rotational speed of the output means (1300) with respect to the second output shaft (7420),
 wherein the output means (1300) comprise output controlling means (1340) controlling a position of the output means (1300) to control a gear ratio of the continuously variable transmission,
 wherein the output controlling means (1340) comprise output elastic means (1342), an output plate (1341) fixed with respect to the first output shaft (1310), output actuating means (1344) and a case (1343) fixed with respect to the at least one of the first output flange (1320) and second output flange (1330) that is movable on the first output shaft (1310),
 wherein the output elastic means (1342) is positioned between the output plate (1341) and the at least one of the first output flange (1320) and second output flange (1330) that is movable on the first output shaft (1310) to bias the position of the output means (1300) toward a lower gear position, and
 wherein the output actuating means (1344) comprise weights positioned between the output plate (1341) and the case (1343) to actuate the output means (1300) toward a higher gear position by means of centrifugal force when the speed of the output means (1300) increases.

3. The continuously variable transmission according to claim 2, wherein the input multiplying means (7510, 7511, 7512, 7513) has a multiplying factor in the range of 5-30.

4. The continuously variable transmission according to claim 2, wherein the output multiplying means (7410, 7411, 7412, 7413) has a multiplying factor in the range of 2-10.

5. The continuously variable transmission according to claim 2, wherein the output controlling means (1340) comprise a preloading means preloading the output elastic means (1342).

6. The continuously variable transmission according to claim 2, wherein the input means (1100) comprise input controlling means controlling a position of the input means (1100).

7. The continuously variable transmission according to claim 6, wherein the input controlling means are remotely controllable and comprise a hydraulic pump or a pneumatic pump or an electric motor or a cable.

8. The continuously variable transmission according to claim 6,
 wherein the input controlling means comprise input elastic means, and
 wherein the spring constant of the output elastic means (1342) is higher than the spring constant of the input elastic means.

9. The continuously variable transmission according to claim 2, wherein the output controlling means (1340) comprise a locking means for locking the position of the output controlling means (1340).

10. The continuously variable transmission according to claim 2, wherein the second input shaft (7520) and the second output shaft (7420) are co-axial.

11. A bicycle comprising:
- a crankshaft;
- a rear axle, and the continuously variable transmission according to claim 2, wherein the second input shaft (7520) is connected, eventually with a first transmission, to the crankshaft; and
- wherein the second output shaft (7420) is connected, eventually with a second transmission, to the rear axle.

12. The bicycle according to claim 11, wherein the first transmission has a first transmission ratio causing the input means (1100) or the second input shaft (7520) to rotate faster than the crankshaft.

13. The bicycle according to claim 11, wherein the second transmission has a second transmission ratio causing the output means (1300) or the second output shaft (7420) to rotate faster than the rear axle.

\* \* \* \* \*